(12) United States Patent
Fritz et al.

(10) Patent No.: US 8,690,244 B2
(45) Date of Patent: Apr. 8, 2014

(54) CHILD RESTRAINT FOR VEHICLE

(75) Inventors: Ward Fritz, Westwood, MA (US);
Andrew W. Marsden, Hingham, MA (US); Walter S. Bezaniuk, Berkley, MA (US); Joe Langley, Foxboro, MA (US); Eric Hyman, South Grafton, MA (US)

(73) Assignee: Cosco Management, Inc., Wilmington, DE (US)

( * ) Notice: Subject to any disclaimer, the term of this patent is extended or adjusted under 35 U.S.C. 154(b) by 357 days.

(21) Appl. No.: 13/100,981

(22) Filed: May 4, 2011

(65) Prior Publication Data
US 2012/0007398 A1 Jan. 12, 2012

Related U.S. Application Data

(60) Provisional application No. 61/331,254, filed on May 4, 2010.

(51) Int. Cl.
*A47D 1/10* (2006.01)

(52) U.S. Cl.
USPC ..................... 297/253; 297/256.16

(58) Field of Classification Search
USPC ................ 297/250.1, 253, 256.14, 256.16
See application file for complete search history.

(56) References Cited

U.S. PATENT DOCUMENTS

| | | |
|---|---|---|
| 958,249 A | 5/1910 | Hirsh |
| 1,825,016 A | 9/1931 | Salisbury |
| 2,326,328 A | 8/1943 | Bush |
| 3,136,579 A | 6/1964 | Hunter |
| 3,510,151 A | 5/1970 | Weman |
| 4,387,489 A | 6/1983 | Dudek |
| 4,660,889 A | 4/1987 | Anthony et al. |
| 4,796,919 A | 1/1989 | Linden |
| 4,854,639 A | 8/1989 | Burleigh et al. |
| 4,893,835 A | 1/1990 | Linden |
| 5,000,481 A | 3/1991 | Wilson |
| 5,186,520 A | 2/1993 | Whitaker et al. |
| 5,236,221 A | 8/1993 | Minami |
| 5,277,472 A | 1/1994 | Freese et al. |
| 5,579,561 A | 12/1996 | Smith et al. |
| 5,611,596 A | 3/1997 | Barley et al. |
| 5,653,003 A | 8/1997 | Freeman |
| 5,671,971 A | 9/1997 | Koyanagi et al. |
| 5,839,789 A | 11/1998 | Koledin |
| 5,845,372 A | 12/1998 | Smith et al. |

(Continued)

FOREIGN PATENT DOCUMENTS

| | | |
|---|---|---|
| EP | 1369296 | 12/2003 |
| EP | 1407922 | 4/2004 |

(Continued)

OTHER PUBLICATIONS

Office Action from related Chinese Patent Application No. 201020662980.9 dated May 10, 2011, 4 pages.

(Continued)

*Primary Examiner* — Milton Nelson, Jr.
(74) *Attorney, Agent, or Firm* — Barnes & Thornburg LLP

(57) ABSTRACT

A child restraint includes a base, a seat, and an anchor belt. The anchor belt holds the base in place on a passenger seat of a vehicle. The seat mounts on the base and supports a child or infant for travel in the vehicle above the base.

17 Claims, 11 Drawing Sheets

(56) References Cited

U.S. PATENT DOCUMENTS

| | | |
|---|---|---|
| 6,152,528 A | 11/2000 | van Montfort |
| 6,247,208 B1 | 6/2001 | Creech |
| 6,318,799 B1 | 11/2001 | Greger et al. |
| 6,390,562 B1 | 5/2002 | Takamizu et al. |
| 6,471,298 B2 | 10/2002 | Carine et al. |
| 6,508,510 B2 | 1/2003 | Yamazaki |
| 6,626,493 B2 | 9/2003 | Kain |
| 6,672,664 B2 | 1/2004 | Yanaka et al. |
| 6,695,400 B2 | 2/2004 | Washizuka et al. |
| 6,779,842 B2 | 8/2004 | McNeff |
| 6,854,415 B2 | 2/2005 | Barnes et al. |
| 7,059,676 B2 | 6/2006 | McNeff |
| 7,163,265 B2 | 1/2007 | Adachi |
| 7,195,315 B2 | 3/2007 | Rikhof |
| 7,216,932 B2 | 5/2007 | Emmert |
| 7,325,871 B2 | 2/2008 | Gangagharan et al. |
| 2002/0043838 A1 | 4/2002 | Yanaka et al. |
| 2002/0062543 A1 | 5/2002 | Dittmar et al. |
| 2003/0151286 A1 | 8/2003 | Kain |
| 2005/0110318 A1 | 5/2005 | Meeker et al. |
| 2005/0184567 A1 | 8/2005 | Carpenter et al. |
| 2005/0253431 A1 | 11/2005 | Hei et al. |
| 2005/0264062 A1 | 12/2005 | Longenecker et al. |
| 2006/0006714 A1 | 1/2006 | Van Geer et al. |
| 2006/0091709 A1 | 5/2006 | Emmert |
| 2006/0261650 A1 | 11/2006 | Billman et al. |
| 2006/0261651 A1 | 11/2006 | Nolan et al. |
| 2007/0069060 A1 | 3/2007 | Maciejczyk |
| 2009/0066131 A1* | 3/2009 | Hendry .................. 297/256.16 |
| 2010/0187880 A1* | 7/2010 | Heisey et al. ............ 297/256.16 |
| 2011/0254331 A1* | 10/2011 | Nagelski et al. ......... 297/216.11 |

FOREIGN PATENT DOCUMENTS

| | | |
|---|---|---|
| EP | 1623868 | 2/2006 |
| EP | 1741593 | 1/2007 |
| NL | 193778 | 10/1996 |
| WO | 2004033251 | 4/2004 |

OTHER PUBLICATIONS

Office Action from related Chinese Patent Application No. 201020662976.2 dated May 16, 2011, 3 pages.

* cited by examiner

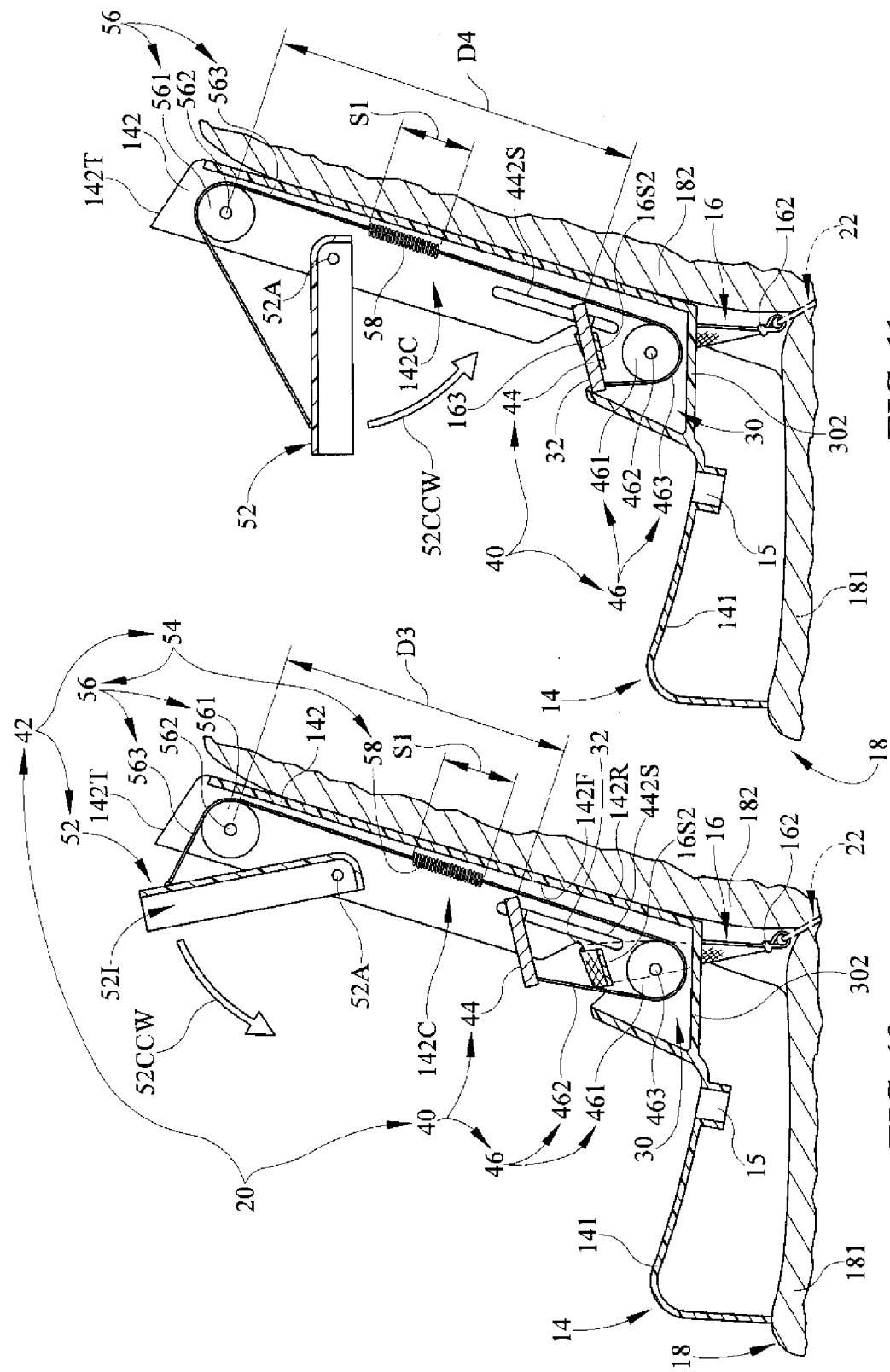

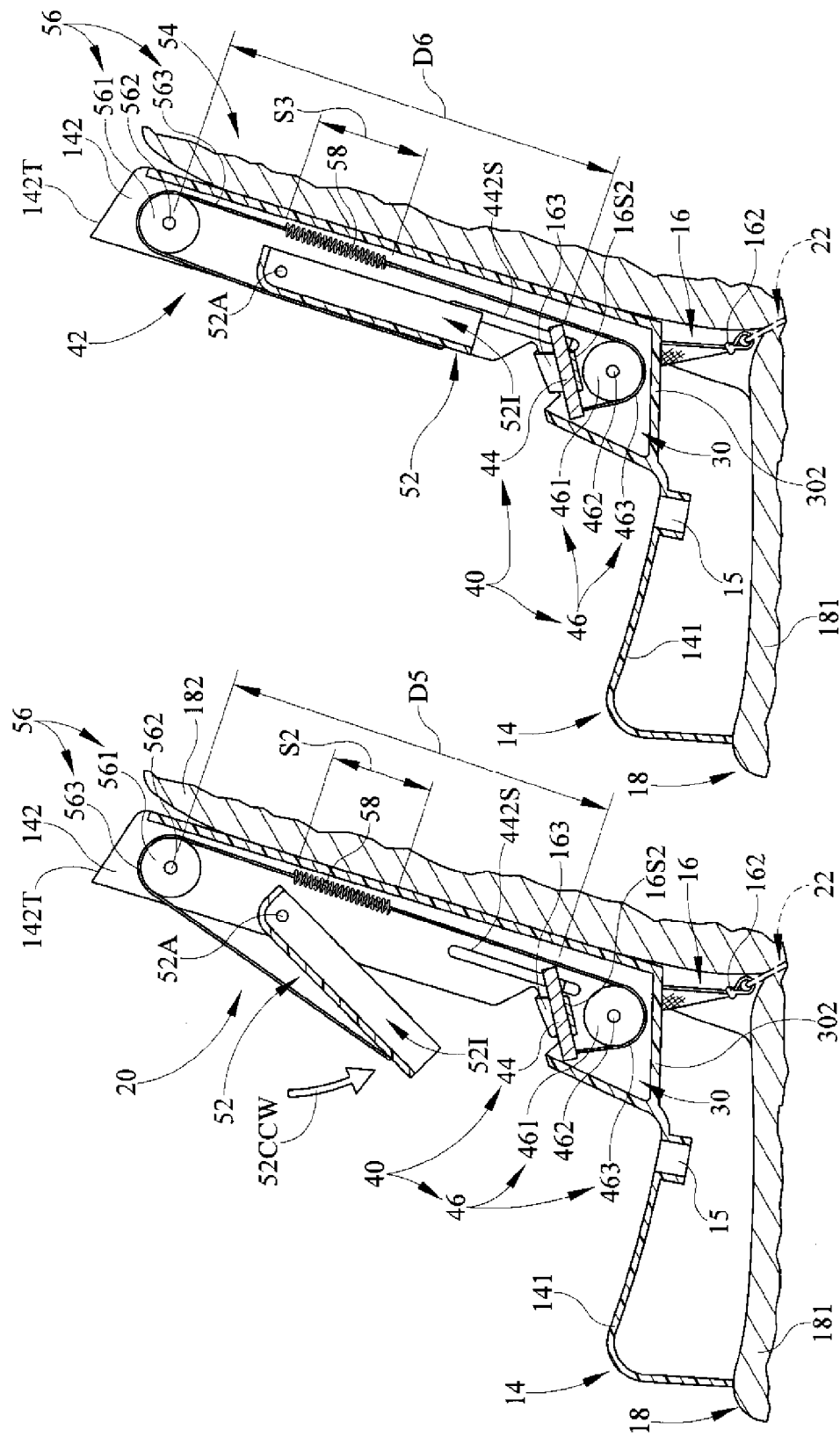

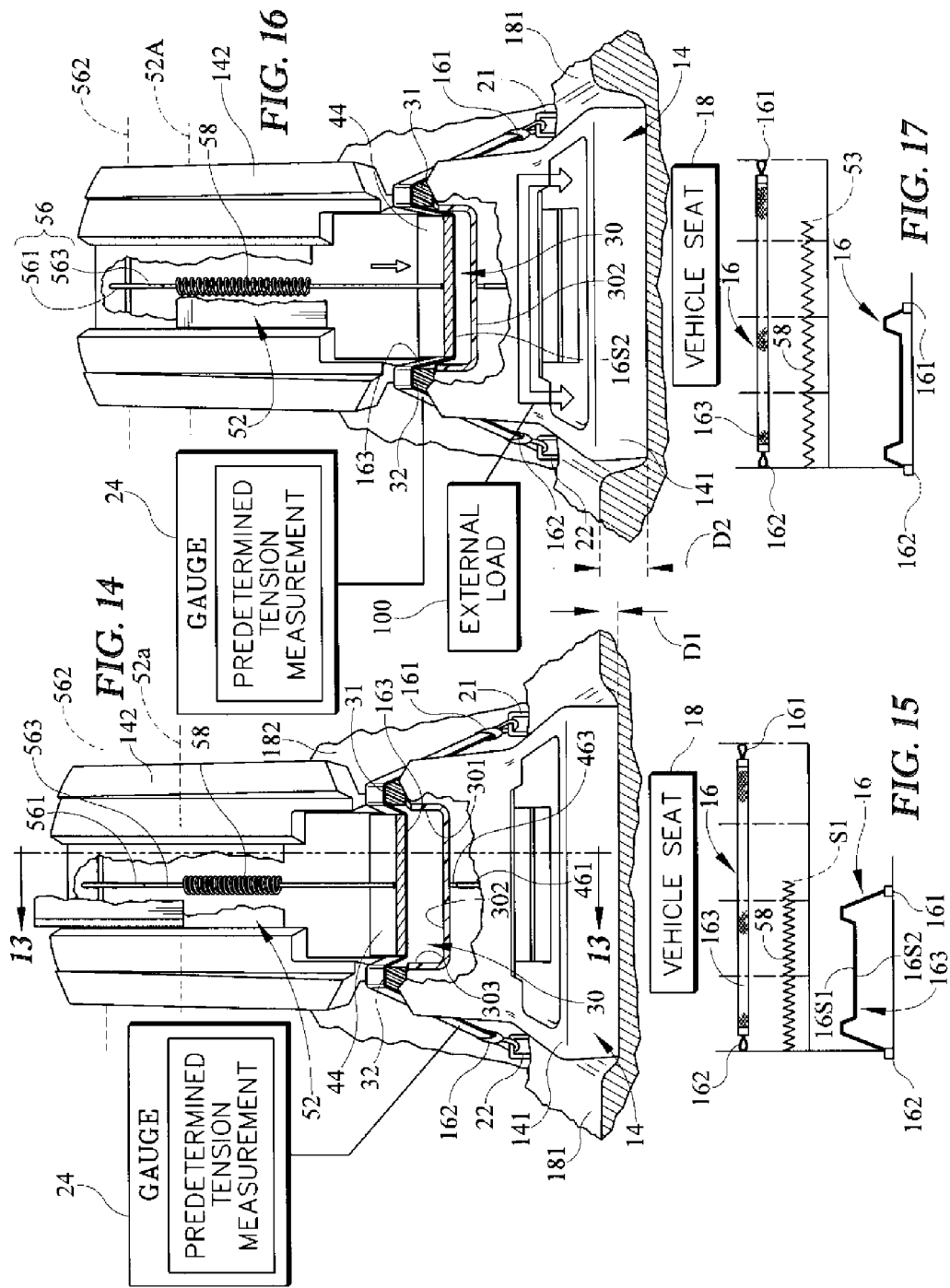

CHILD RESTRAINT FOR VEHICLE

PRIORITY CLAIM

This application claims priority under 35 U.S.C. §119(e) to U.S. Provisional Application Ser. No. 61/331,254, filed May 4, 2010, which is expressly incorporated by reference herein.

BACKGROUND

The present disclosure relates to child restraints, and particularly to child restraints for use on passenger seats in vehicles. More particularly, the present disclosure relates to a child restraint including a base held in place on an underlying passenger seat by an anchor belt coupled to the vehicle and a juvenile seat coupled to the base.

SUMMARY

A child restraint in accordance with the present disclosure includes an anchor belt and a juvenile holder configured to hold a young child or an infant. The anchor belt is adapted to be coupled to anchor mounts included in a vehicle to retain the juvenile holder in place on a passenger seat in a vehicle.

In illustrative embodiments, the juvenile holder includes a shell-support base adapted to set on the passenger seat in a vehicle in close proximity to the first and second anchor mounts included in the vehicle. The juvenile holder also includes a juvenile seat shell adapted to be coupled to the shell-support base. The anchor belt includes a first connector adapted to be coupled to the first anchor mount and a second connector adapted to be coupled to the second anchor mount. The anchor belt also includes a strap arranged to extend between the first and second anchor mounts and lie on the shell-support base and extend along an initial belt path between the first and second anchor mounts when the first connector is coupled to the first anchor mount and the second connector is coupled to the second anchor mount to establish a just-installed position of the anchor belt on the shell-support base.

In illustrative embodiments, the child restraint further includes a belt tensioner coupled to a back included in the shell-support base and configured to be used by a caregiver to change the belt path and increase tension in the anchor belt during a first actuation stage that takes place before the juvenile seat shell is coupled to the shell-support base. The belt tensioner is configured to include means for moving the anchor belt relative to the shell-support base from the initial belt path to a first changed belt path to take slack out of the anchor belt before a caregiver couples the juvenile seat shell to the shell-support base and while the anchor belt remains coupled to the first and second anchor mounts to lie in the just-installed position. Removal of such anchor-belt slack acts to increase tension in the anchor belt from an initial installation tension associated with the just-installed position of the anchor belt to a relatively greater predetermined tension so that the shell-support base is tethered to the vehicle in a relatively stationary position on the passenger seat in accordance with a predetermined specification.

In illustrative embodiments, the belt tensioner includes a belt pusher, a pivotable actuator lever mounted on the back of the shell-support base, and an energy-storage spring coupled to the belt pusher and to the actuator lever. In use, a caregiver throws the actuator lever to move the belt pusher against the installed anchor belt to set the anchor belt to the predetermined tension and to store energy in the spring. If any unexpected detensioning of the anchor belt occurs later (e.g., because of climate change in the vehicle, change in cushion characteristics of the passenger seat, movement and/or size of child restrained in the juvenile seat shell, etc.), then energy stored in the spring is released automatically during a subsequent second actuation stage to move the belt pusher further relative to the shell-support base to increase tension in the anchor belt back to the predetermined tension without use of the actuator lever by the caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is a perspective view of the shell-support base of FIG. 1 in place on the passenger seat of FIG. 1 before use of the belt tensioner to take slack out of the anchor belt that has been arranged to extend along an initial belt path across a middle section of the shell-support base and lie in the just-installed position on the shell-support base and showing that a section of the shell-support base has been removed to show a belt-receiving channel located under a central portion of a strap included in the anchor belt and formed between first and second belt-support pads supporting the anchor belt to cause the central portion of the anchor belt strap to form a bridge spanning the belt-receiving channel while opposite ends of the anchor belt are coupled to the anchor mounts to establish the initial belt path of the anchor belt and retain the anchor belt in the just-installed position on the shell-support base;

FIG. 6 is a perspective view similar to FIG. 4, with portions broken away to reveal that the belt pusher has engaged and moved the central portion of the anchor belt strap to change the belt path of the anchor belt relative to the underlying shell-support base as a result of pivoting movement of an actuation lever also included in the belt tensioner in a counterclockwise direction (solid double arrow) to increase tension in the anchor belt to a level-one tension (that is greater than the initial installation tension) as represented diagrammatically by a belt-tension gauge coupled to the anchor belt;

FIG. 7 is a perspective view similar to FIGS. 4 and 6 showing further counterclockwise pivoting movement of the actuation lever to change the belt path of the anchor belt further relative to the underlying shell-support base so as to increase tension in the anchor belt to a relatively greater level-two tension;

FIG. 8 is a perspective view similar to FIGS. 4, 6, and 7 showing that the belt pusher has been moved far enough in a downward direction into the belt-receiving channel formed between the first and second belt-support pads to cause the anchor belt to extend along a first changed belt path to increase tension in the anchor belt to reach a predetermined tension (PT) that is greater than the initial installation tension (IT) so that movement of the shell-support base relative to the underlying passenger seat is limited in accordance with a predetermined specification;

FIG. 10 is an enlarged sectional view taken along line 10-10 of FIG. 4;

FIG. 11 is an enlarged sectional view taken along line 11-11 of FIG. 6;

FIG. 12 is an enlarged sectional view taken along line 12-12 of FIG. 7;

FIG. 13 is an enlarged sectional view taken along line 13-13 of FIG. 8;

FIG. 14 is a front perspective view of the child restraint of FIG. 8, with portions broken away to show that the central portion of the anchor belt strap has been pushed into the belt-receiving channel formed in the back of the shell-support base and located between the first and second belt-support pads by the belt pusher to cause the anchor belt now to extend along a first changed belt path to increase tension in the anchor belt to reach the predetermined tension as measured by a belt-tension gauge coupled to an outer portion of the anchor belt strap;

FIG. 15 is a diagrammatic illustration showing (from bottom to top) the shape of the anchor belt when it is caused to extend along the first changed belt path, the effective length of a cable-mover spring included in the belt tensioner when the anchor belt is caused to extend along the first changed belt path, and the length of the anchor belt;

FIG. 16 is a front perspective view similar to FIG. 14 showing that the child restraint (with the juvenile seat shell omitted) has moved relative to the passenger seat in response to, for example, application of an external load to the child restraint, with portions broken away to show that the central portion of the anchor belt strap has been pushed further into the belt-receiving channel by a downward force generated using energy stored in the cable-mover spring and applied to the anchor belt strap by the belt pusher to change the path of the anchor belt so that the anchor belt now extends along a second changed belt path that is different from the first changed belt path so as to restore the anchor belt to the predetermined tension without any movement of the actuator lever relative to the shell-support base;

FIG. 17 is a diagrammatic illustration similar to FIG. 15 showing (from bottom to top) the shape of the anchor belt when it is caused to extend along the second changed belt path, the increased effected length of the cable-mover spring included in the belt tensioner after it has released stored energy to apply a further downward force to the central portion of the anchor belt strap to change the belt path of the anchor belt, and the unchanged length of the anchor belt as compared to the anchor belt depicted in FIGS. 14 and 15;

DETAILED DESCRIPTION

Figure 1:
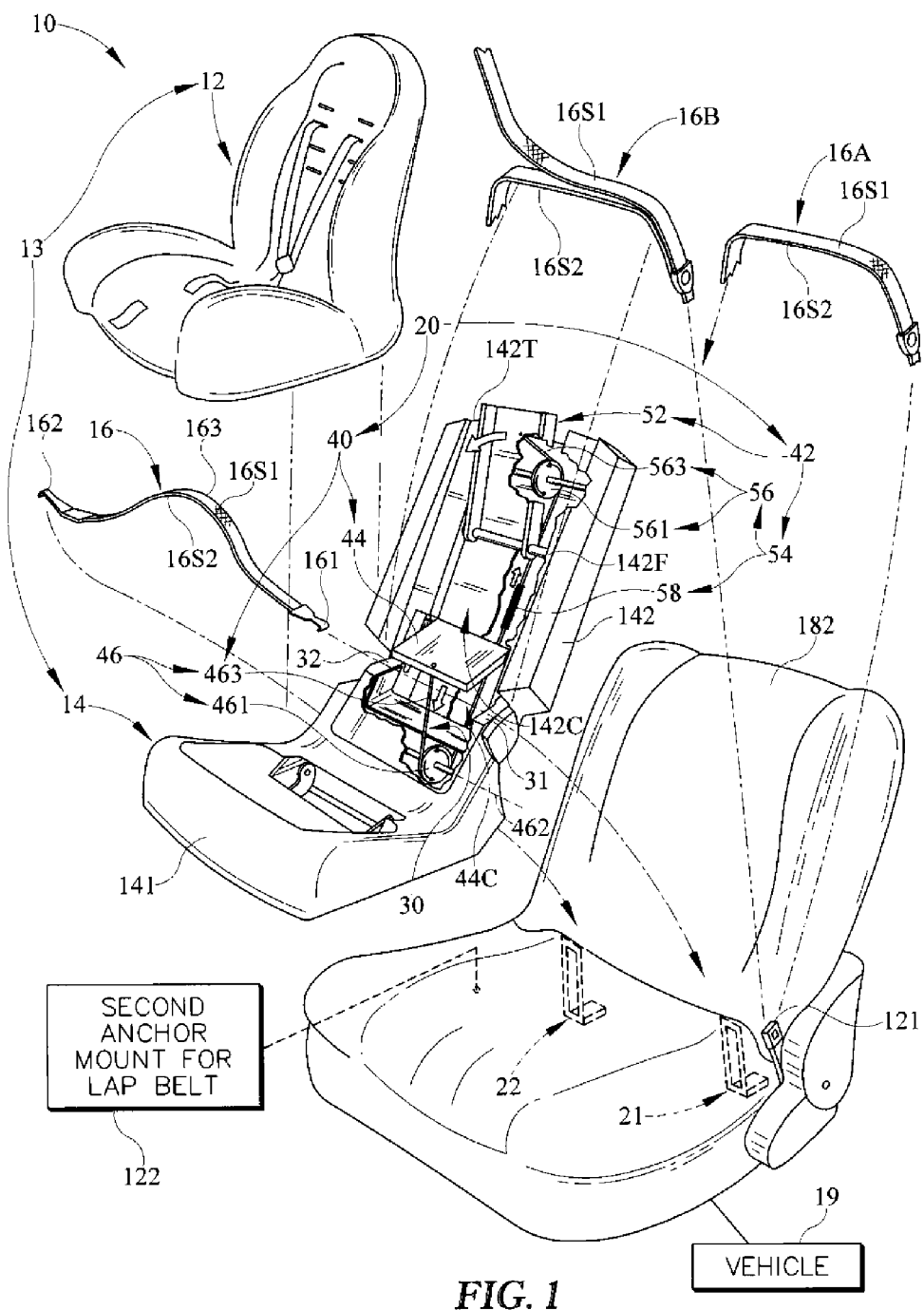
FIG. 1 is an exploded perspective assembly view of a child restraint in accordance with the present disclosure adapted to be anchored in place on a passenger seat in a vehicle to anchor mounts associated with the passenger seat and showing that the child restraint comprises a juvenile holder including a juvenile seat shell and an L-shaped shell-support base located under the juvenile seat shell and configured to rest on the underlying passenger seat, three alternative anchor belts [e.g., either a LATCH belt (on the left), a lap belt (on the right), or a lap-and-shoulder belt harness (on the top)] for mating with the anchor mounts to hold the shell-support base in place on the passenger seat, and a lever-actuated belt tensioner mounted on an upper portion of the shell-support base and used by an installer to take the slack out of the anchor belt after it has been laid across the shell-support base and coupled at each end to one of the anchor mounts associated with the passenger seat to extend along an initial belt path as shown, for example, in FIGS. 2-5 so that tension in the anchor belt can be increased by moving the actuator lever included in the belt tensioner as suggested in FIGS. 6-8 to reach a predetermined tension as suggested in FIG. 8.
Figure 8:
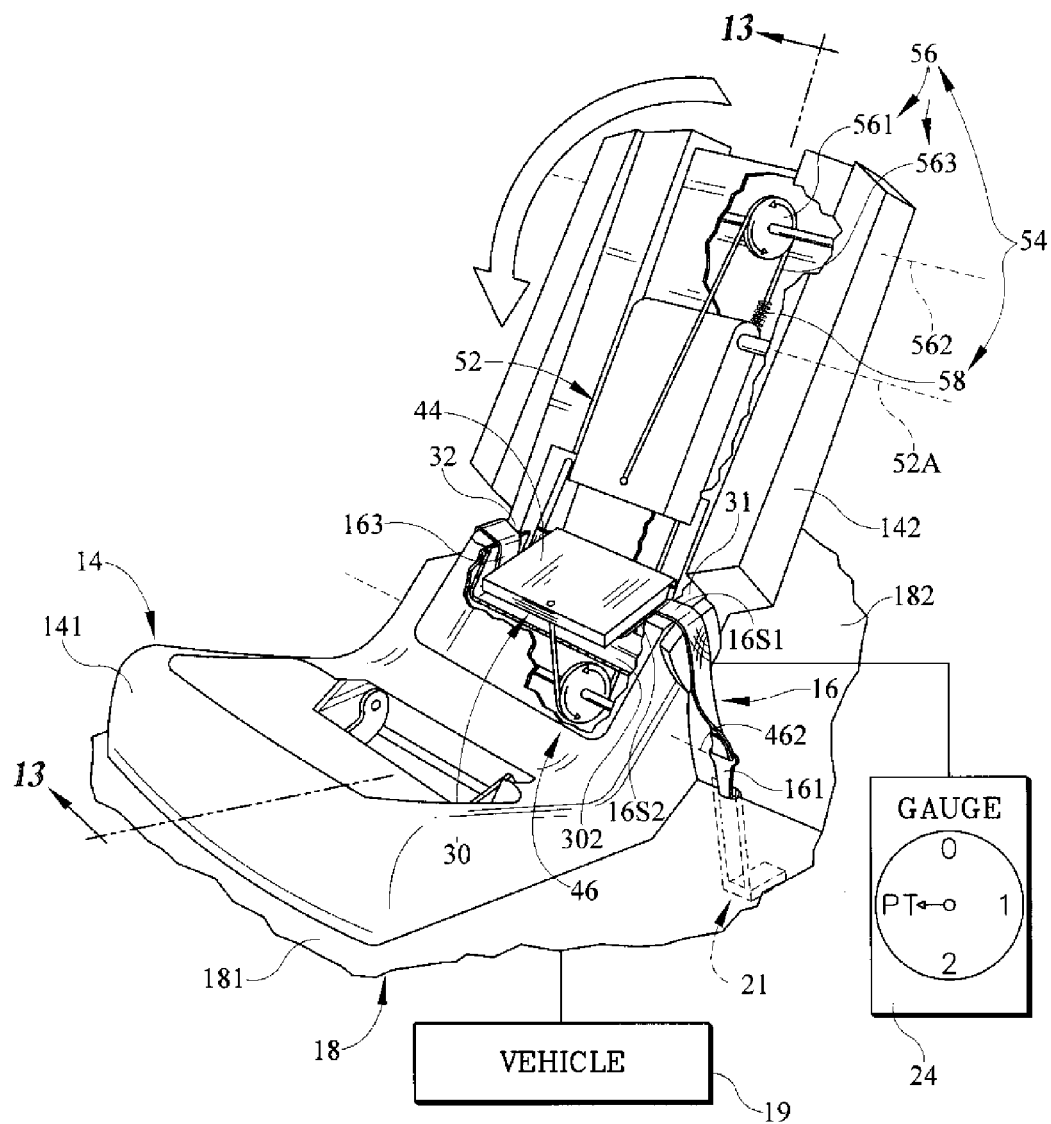
Figure 9:
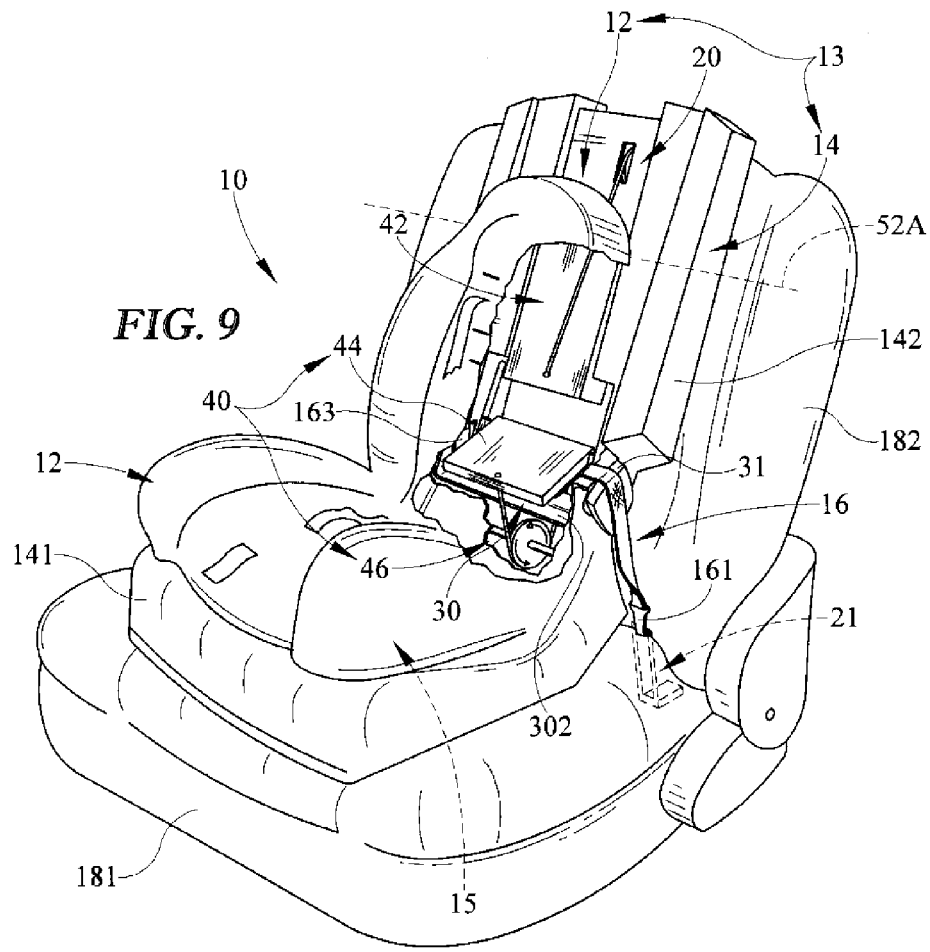
FIG. 9 is a perspective view of a juvenile seat shell mounted in a forward-facing position on the shell-support base of FIG. 8 to form a juvenile holder after the belt tensioner has been used to change the belt path of the anchor belt relative to the shell-support base to increase tension in the anchor belt to a predetermined tension so that movement of the shell-support base and the juvenile seat shell coupled to the underlying shell-support base relative to an underlying passenger seat in a vehicle is limited in accordance with a predetermined specification.

A child restraint 10 includes a juvenile seat shell 12, a shell-support base 14, and an anchor belt 16 as suggested in FIGS. 1 and 9. Shell-support base 14 is adapted to set on an underlying passenger seat 18 in a vehicle 19 and is held in place in an initial installation position on passenger seat 18 using anchor belt 16 as suggested in FIGS. 2-4 and 10. In this just-installed position, anchor belt 16 is coupled by a caregiver to first and second anchor mounts 21, 22 arranged to lie on shell-support base 14 so as to exhibit an initial installation tension (IT) when exposed to a belt-tension gauge 24 as suggested in FIG. 4. Child restraint 10 is configured in accordance with the present disclosure to allow a caregiver to move the installed anchor belt 16 relative to shell-support base 14 from the just-installed position to another position to increase tension in anchor belt 16 to reach a relatively greater predetermined tension (PT) as suggested in FIGS. 4-8 before juvenile seat shell 12 is coupled by the caregiver to shell-support base 14.

Figures 9A, 9B:
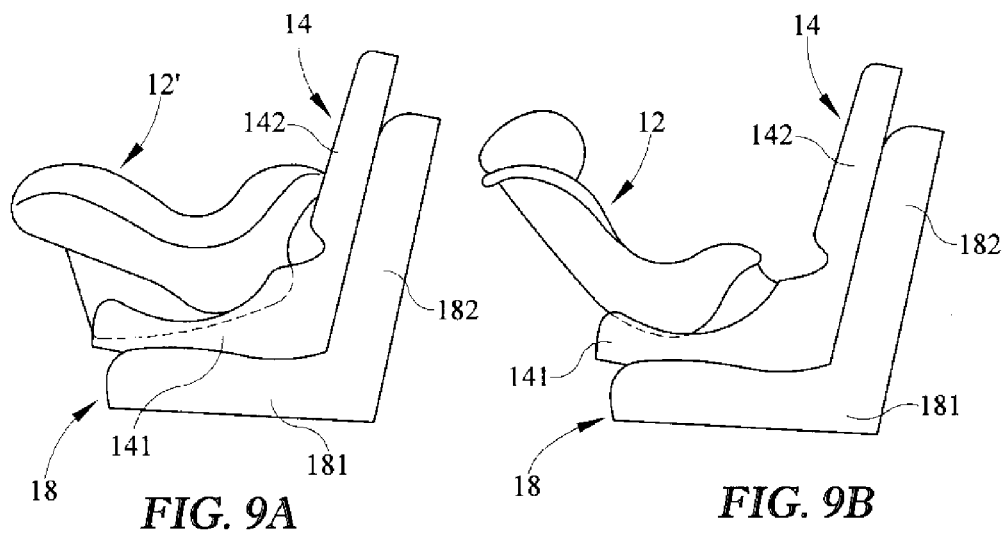
FIG. 9A is a reduced-size side elevation view of the shell-support base of FIG. 8 carrying a juvenile seat shell expressed as an infant carrier.
FIG. 9B is a reduced-size side elevation view of the shell-support base of FIG. 8 carrying a juvenile seat shell in a rear-facing position thereon.

Child restraint 10 also includes a belt tensioner 20 mounted for movement on shell-support base 14. Belt tensioner 20 is used by a caregiver (not shown) during a first actuation stage before juvenile seat shell 12 is coupled to shell-support base 14 to cause a belt pusher 40 included in belt tensioner 20 to move a portion of anchor belt 16 relative to shell-support base 14 while anchor belt 16 is coupled to anchor mounts 21, 22 to take slack out of anchor belt 16 as suggested in FIGS. 6-8 so as to increase tension in anchor belt 16 from the initial installation tension (IT) to a relatively greater predetermined tension (PT). This increase in belt tension causes shell-support base 14 to be tethered to vehicle 19 in a relatively stationary position on passenger seat 18 as suggested in FIGS. 8 and 13. Then juvenile seat shell 12 can be coupled to shell-support base 14 by the caregiver in one of several different ways as suggested in FIGS. 9, 9A, and 9B after anchor belt 16 has been stretched to reach the predetermined tension (PT).

A second actuation stage can take place automatically without any action on the part of a caregiver while juvenile seat shell 12 is mounted on shell-support base 14 in the event that any unexpected detensioning of anchor belt 16 occurs later as suggested in FIGS. 17-20. As disclosed herein, energy is stored in a spring 58 included in belt tensioner 20 during the first actuation stage owing, e.g., to extension of spring 58 during use of belt pusher 40 to increase tension in anchor belt 16 as shown in FIGS. 10-13. Energy stored in spring 58 is released automatically during a subsequent second actuation stage after juvenile seat shell 12 has been mounted on shell-support base 14 to move belt pusher 40 included in belt tensioner 20 further relative to shell-support base 14 to increase tension in anchor belt 16 back to the predetermined tension (PT) as suggested in FIGS. 19 and 20.

Juvenile seat shell 12 (or any suitable juvenile seat) may be coupled to shell-support base 14 using any suitable means to provide a juvenile holder 13 as suggested in FIGS. 1 and 9 after belt tensioner 20 is used by a caregiver during the first actuation stage to tension anchor belt 16 to the predetermined tension (PT). It is within the scope of this disclosure to orient juvenile seat shell 12 to lie in a forward-facing direction on shell-support base 14 as suggested in FIGS. 1 and 9. Juvenile seat shell 12 alternatively can be oriented to lie in a rearwardly facing direction on shell-support base 14 as suggested in FIG. 9B. Alternatively, an infant carrier 12 can be coupled to shell-support base 14 as suggested in FIG. 9A.

Shell-support base 14 includes a foundation 141 and a back 142 arranged to extend upwardly from foundation 141 as shown, for example, in FIG. 1. Foundation 141 is adapted to set on a bench 181 included in passenger seat 18 while back 142 is adapted to contact a backrest 182 included in passenger seat 18 as suggested in FIGS. 1 and 9. In illustrative embodiments, belt tensioner 20 is coupled to back 142 of shell-support base 14 as suggested in FIG. 1.

Belt tensioner 20 is used in accordance with the present disclosure during a first actuation stage to increase tension in anchor belt 16 to a predetermined tension (PT) from a relatively lower initial installation tension (IT) that was reached following initial installation of anchor belt 16 on shell-support base 14 to mate with first and second anchor mounts 21, 22. Anchor belt 16 is a LATCH belt in the illustrated embodiment and is configured to mate with LATCH anchor mounts 21, 22 in a LATCH system in a conventional way as suggested in FIGS. 1-3. LATCH stands for Lower Anchors and Tethers for Children. LATCH is a system in the Untied States that standardizes the installation of child restraints in vehicles without using the lap or shoulder belts provided in the vehicle.

Belt tensioner 20 can also be used in accordance with the present disclosure to tension an anchor belt other than LATCH anchor belt 16 as suggested in FIG. 1. Belt tensioner 20 can tension a vehicle lap belt 16A that is arranged to lie on shell-support base 14 and is coupled to first and second (lap belt) anchor mounts 121, 122 included in vehicle 19 and associated with passenger seat 18 as suggested in FIG. 1. Belt tensioner 20 can also tension a vehicle lap-and-shoulder belt harness 16B that is arranged to lie on shell-support base 14 and is coupled to first and second (lap belt) anchor mounts 121, 122 as suggested in FIG. 1.

Figures 4, 5:
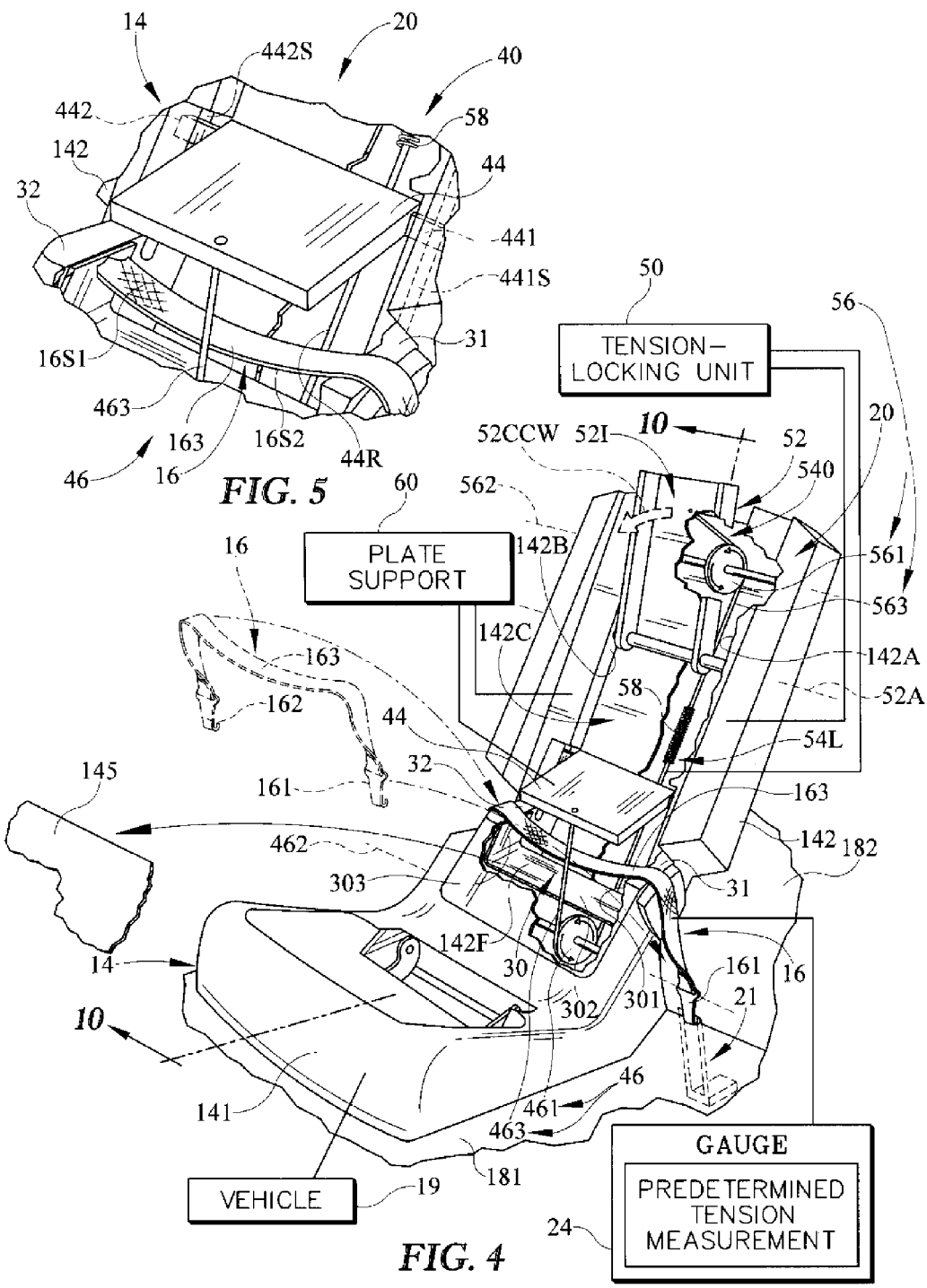
FIGS. 4, 6, 7, and 8 are a series of partial perspective views showing that the L-shaped shell-support base is coupled to the passenger seat using the anchor belt and that the lever-actuated belt tensioner is operated by a caregiver before a juvenile seat shell is mounted on the L-shaped shell-support base to apply a force to the installed anchor belt to change the belt path of the anchor belt relative to the shell-support base and increase tension in the anchor belt to reach a predetermined tension (PT) that is greater than the initial installation tension (IT) so as to retain the child restraint in a substantially stationary position on the underlying passenger seat as shown in FIG. 9.
FIG. 5 is a partial perspective view of the shell-support base shown in FIG. 4 showing a belt pusher included in the belt tensioner and used to apply a downward force to the central portion of the anchor belt strap and showing that the belt pusher is mounted for up-and-down movement in a central channel defined between two spaced-apart left-side and right-side side walls included in the back of the shell-support base and showing that such up-and-down movement of the belt pusher is guided by sliding motion of outwardly extending pins included in the belt pusher in companion guide slots formed in the left-side and right-side side walls.

Belt tensioner 20 is configured to include means 40, 42 for moving the anchor belt 16 relative to shell-support base 14 before juvenile seat shell 12 is coupled to shell-support base 14 and while anchor belt 16 is coupled to first and second anchor mounts 21, 22 and a portion of the anchor belt 16 remains in contact with a portion of shell-support base 14 from the initial belt path shown in FIGS. 4 and 10 to a first changed belt path shown, for example, in FIGS. 8, 9, and 13. Such movement of anchor belt 16 takes slack out of anchor belt 16 so as to increase tension in anchor belt 16 from an initial installation tension (IT) associated with the just-installed position of anchor belt 16 to a relatively greater predetermined tension (PT) as suggested in FIG. 8 so that movement of shell-support base 14 and juvenile seat shell 12 later coupled to shell-support base 14 to form a juvenile holder 13 relative to an underlying passenger seat 18 in a vehicle 19 is limited in accordance with a predetermined specification as suggested in FIG. 9.

Shell-support base 14 is formed to include spaced-apart first and second belt-support pads 31, 32 and a belt-receiving channel 30 located between belt-support pads 31, 32 as shown, for example, in FIGS. 1 and 4-6. Belt-support pads 31, 32 are located on opposite sides of foundation 141 and arranged to face upwardly to support anchor belt 16 in the just-installed position on shell-support base 14 after anchor belt 16 is arranged to extend across a middle section of shell-support base 14 and is coupled to first and second anchor mounts 21, 22 as suggested in FIGS. 2 and 3. As suggested in FIGS. 4 and 17, belt-receiving channel 30 is bounded by a right wall 301 appended to an inner edge of first belt-support pad 31, a left wall 303 appended to an inner edge of second belt-support pad 32, and a channel floor 302 extending laterally between lower edges of right and left walls 301, 302.

Belt tensioner 20 includes a belt pusher 40 that is arranged to lie between first and second belt-support pads 31, 32 and below belt-receiving channel 30 as suggested in FIGS. 1, 4, 17, and 18. Belt tensioner 20 also includes a cable-moving system 42 for moving belt pusher 40 relative to shell-support base 14 first to engage a first surface 16S1 of anchor belt 16 while anchor belt 16 is retained in the just-installed position lying on first and second belt-support pads 31, 32 and then to move a portion of anchor belt 16 in belt-receiving channel 30 toward channel floor 302 to increase tension in anchor belt 16 until the predetermined tension (PT) is reached. In illustrative embodiments, an opposite second surface 16S2 of anchor belt 16 is arranged to lie in spaced-apart relation to channel floor 302 when the predetermined tension (PT) is reached as suggested in FIGS. 8, 9, 13, and 17 so as to maximize the slack that can be taken out of anchor belt 16 by belt tensioner 20. Then juvenile seat shell 12 can be mounted by the caregiver on foundation 141 of shell-support base 14 as shown, for example, in FIG. 9, 9A, or 9B.

Belt pusher 40 includes a push plate 44 arranged to lie above anchor belt 16 and a plate puller 46 arranged to extend downwardly from push plate 44 as shown, for example, in FIGS. 4 and 5. Plate puller 46 is coupled to cable-moving system 42 as suggested in FIGS. 1, 4, and 10.

Push plate 44 is arranged normally to overlie a central portion of a strap 163 included in anchor belt 16 when anchor belt 16 is retained in the just-installed position on shell-support base 14 as suggested in FIGS. 1 and 4. In an illustrative embodiment, anchor belt 16 includes a first connector 161 configured to mate with first anchor mount 21, a second connector 162 configured to mate with second anchor mount 22, and a strap 163 arranged to interconnect first and second connectors 161, 162 and lie on first and second belt-support pads 31, 32 when anchor belt 16 is retained in the just-installed position as shown, for example, in FIGS. 1-5. First and second belt-support pads 31, 32 are arranged to support anchor belt 16 to cause the central portion of anchor belt strap 163 to form a bridge spanning belt-receiving channel 30 while connectors 161, 162 are coupled to anchor mounts 21, 22 to establish an initial belt path of anchor belt 16 extending across a middle section of shell-support base 14 as suggested in FIGS. 4 and 5.

Plate puller 46 includes a pull-cable pulley 461 configured to rotate about a lower-pulley axis 462 and a pull cable 463 routed around the pull-cable pulley 461 and coupled to push plate 44 at a first end of pull cable 463 as suggested in FIGS. 1 and 14. As an example, a tension-locking unit 50 may be included in belt tensioner 20 and be configured to retain belt pusher 40 in desired positions relative to shell-support base 14 after anchor belt 16 has been tensioned to reach the predetermined (PT) as suggested in FIG. 4.

Cable-moving system 42 includes an actuator 52 and a force-transfer device 54 coupled to actuator 52 and to belt pusher 40 as suggested in FIG. 1. Actuator 52 is mounted on shell-support base 14 to be moved by a caregiver relative to shell-support base 14 during the first actuation stage from an inactive position to an active position before juvenile seat shell 12 is coupled to shell-support base 14. Force-transfer device 54 is coupled to belt pusher 40 and to actuator 52 and is configured to apply a downward force to belt pusher 40 to cause belt pusher 40 to push downwardly on first surface 16S1 of the central portion of anchor belt strap 163 in response to movement of actuator 52 relative to shell-support base 14 from the inactive position shown, for example, in FIGS. 4 and 10 to the active position shown, for example, in FIGS. 8 and 13.

Actuator 52 is a lever mounted on back 142 of shell-support base 14 for pivotable movement about an actuator pivot axis 52A in an illustrative embodiment as suggested in FIG. 4. In an inactive position, actuator lever 52 is arranged, for example, to extend upwardly away from foundation 141 as suggested in FIGS. 1-4 and 10. The caregiver can pivot actuator lever 52 about actuator pivot axis 52A in a counterclockwise direction 52CCW to reach an active position shown, for example, in FIGS. 8 and 13 in which anchor belt 16 has been tensioned to the predetermined tension (PT). In the action position, actuator lever 52 is deposited into a lever-receiving channel 142C formed in back 142 of shell-support base 14 so as not to interfere with the subsequent mounting of juvenile seat shell 12 on foundation 141 of shell-support base 14.

In an illustrative embodiment, force-transfer device 54 includes a spring mount 56 coupled to actuator lever 52 and a spring 58 coupled to and interposed between belt pusher 40 and spring mount 56. Spring mount 56 includes a spring-cable pulley 561 which is coupled to back 142 of shell-support base 14 to rotate about an upper pulley axis 562 and a spring cable 563 routed around the spring-cable pulley 561 and coupled on a first end to actuator lever 52 and on an opposite second end to spring 58 as suggested in FIGS. 4 and 10.

Spring mount 56 is coupled to back 142 of shell-support base 14 and configured to move in response to rotation of actuator 52 as suggested, for example, in FIGS. 10-13. Actuator pivot axis 52A is arranged to lie to lie between upper pulley axis 562 and lower-pulley axis 462 in an illustrative embodiment shown in FIGS. 10-13.

Force-transfer device 54 includes an upper end 54U coupled to actuator lever 52 and an opposite lower end 54L as suggested in FIGS. 4 and 10. Belt pusher 40 includes a push plate 44 arranged to engage the central portion of anchor belt strap 163 and a plate puller 46 arranged to extend downwardly from push plate 44 to engage lower end 54L of force-transfer device 54 as also suggested in FIGS. 4 and 10.

Shell-support base 14 is formed to include a pin-receiving slot 442S defining a motion guide for belt pusher 40 as suggested in FIG. 5. Belt pusher 40 further includes an outwardly extending pin 442 coupled to push plate 44 and arranged to extend into pin-receiving slot 442S as suggested in FIG. 5 and move up and down therein to guide movement of belt pusher 40 relative to shell-support base 14 during pivoting movement of actuator lever 52 about actuator pivot axis 52A between the inactive and active positions as suggested in FIGS. 10-13.

Belt pusher 40 may also include a plate support 60, as shown diagrammatically in FIG. 4. Plate support 60 is configured to provide means for retaining push plate 44 in spaced-apart relation above anchor belt 16 when actuator lever 52 is in the inactive state. As an example, plate support 60 may be a spring coupled to outwardly extending pin 442 and shell-support base 14 and configured to provide a bias force in the upward direction, however, any other suitable means may be used.

Figures 6, 6A:
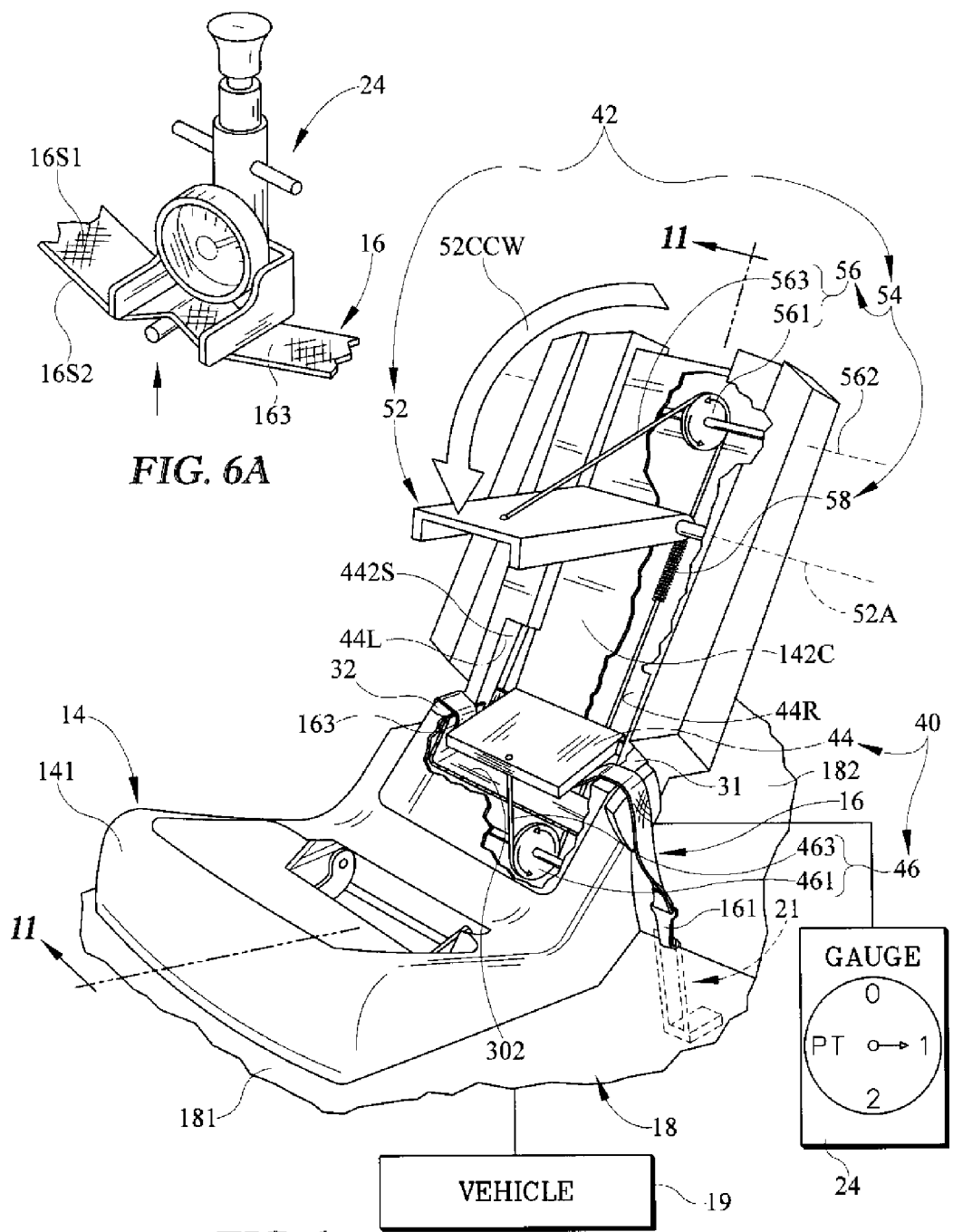
FIG. 6A is a perspective view of an illustrative belt-tension gauge coupled to an outer portion of the anchor belt strap located between the belt pusher and one of the anchor mounts.

Belt pusher 40 is mounted for up-and-down movement in a central channel 44C formed in shell-support base 14 and defined between spaced-apart left-side and right-side side walls 44L, 44R included in shell-support base 14 as suggested in FIGS. 5 and 6. In an illustrative embodiment, up-and-down movement of push plate 44 is guided by sliding motion of first and second outwardly extending pins 441, 442 included in belt pusher 40 and coupled to push plate 44 in companion pin-receiving slots 441S, 442S formed in right-side and left-side side walls 44R, 44L as suggested in FIGS. 5 and 6.

Actuator lever 52 is formed to include an interior region 521 as suggested in FIGS. 4, 6, and 10. Force-transfer device 54 is arranged to lie in interior region 521 of actuator lever 52 upon movement of actuator lever 52 to the active position as suggested in FIG. 13.

Back 142 of shell-support base 14 is arranged to extend upwardly from foundation 141 and terminate along a top edge 142T arranged to lie in spaced-apart relation to foundation 141 and actuator pivot axis 52A is located in spaced-apart relation below top edge 142T of back 142 of shell-support base 14 as suggested in FIGS. 4 and 10. Back 142 is formed to include a forwardly opening channel 142C extending from about top edge 142T downwardly toward foundation 141 as suggested in FIGS. 4 and 10. Actuator lever 52 is sized and shaped to lie in forwardly opening channel 142C to locate force-transfer device 54 in forwardly opening channel 142C in a space provided between actuator lever 52 and back 142 of shell-support base 14 upon movement of actuator lever 52 to the active position as suggested in FIGS. 8 and 13.

Actuator lever 52 is arranged to lie in channel 142C formed in back 142 of shell-support base 14 in response to movement of actuator lever 52 to the active position. Back 142 is formed to include a pair of side walls 142A, 142B arranged to lie in spaced-apart relation to one another and a floor 142F as suggested in FIG. 4. Floor 142F is arranged to extend between side walls 142A, 142B and cooperate with side walls 142A, 142B to form boundaries of channel 142C. Force-transfer device 54 is arranged to lie in channel 142C formed in back 142 in a position between actuator lever 52 and floor 142F in response to movement of actuator lever 52 to the active position as suggested in FIGS. 8 and 13. A portion of plate puller 46 is arranged to extend into channel 142C and lie in channel 142C during pivoting movement of actuator lever 52 from the inactive position to the active position as suggested in FIGS. 10-13.

Back 142 has a rear face 142R adapted to face toward a backrest 182 included in passenger seat 18 and arranged to extend upwardly from bench 181 as suggested in FIG. 10. Back 142 also includes a front face 142F arranged to face toward juvenile seat shell 12 when juvenile seat shell 12 is coupled to shell-support base 14 as suggested in FIGS. 1 and 9.

Belt tensioner 20 is coupled to the front face of back 142 of shell-support base 14. Actuator lever 52 is mounted on back 142 for pivotable movement about actuator pivot axis 52A. Belt pusher 40 is arranged to lie between foundation 141 and actuator pivot axis 52A. Push plate 44 of belt pusher 40 is positioned to lie above anchor belt strap 163. Force-transfer device 54 is arranged to interconnect belt pusher 40 and actuator lever 52 and extend in downward direction toward foundation 141 and away from actuator lever 52.

In use, shell-support base 14 is held in place on passenger seat 18 by anchor belt 16 as shown in FIGS. 4 and 10 before a caregiver has taken out any slack in anchor belt 16 using belt tensioner 20. Anchor belt 16 is coupled to and arranged to extend between anchor mounts 21, 22 and along an initial belt path across a middle section of shell-support base 14 and lie in a just-installed position on shell-support base 14. Belt-tension gauge 24 can be used to record an initial installation tension measurement of anchor belt 16 while it lies in the just-installed position on shell-support base 14 as suggested diagrammatically in FIG. 4.

Lever-actuated belt tensioner 20 is operated by a caregiver to apply a force to the installed anchor belt 16 to change the belt path of anchor belt 16 relative to shell-support base 14 and increase tension in anchor belt 16 to reach a predetermined tension (PT) before juvenile seat shell 12 is mounted on foundation 141 of shell-support base 14 as suggested in FIGS. 4 and 6-8. This predetermined tension (PT) is greater than the initial installation tension (IT) so as to retain child restraint 10 in a substantially stationary position on the underlying passenger seat 18 as shown in FIG. 9.

Shell-support base 14 is held in place on passenger seat 18 before use of the belt tensioner 20 to take slack out of anchor belt 16 as suggested in FIGS. 4 and 10. A section 14S of shell-support base 14 has been removed to show a belt-receiving channel 30 located under a central portion of anchor belt strap 163 and formed between first and second belt-support pads 31, 32 supporting anchor belt 16 as suggested in FIG. 4. The central portion of anchor belt strap 163 forms a bridge spanning belt-receiving channel 30 while opposite ends of anchor belt 16 are coupled to anchor mounts 21, 22 to establish the initial belt path of anchor belt 16 and retain anchor belt 16 in the just-installed position on shell-support base 14. In this initial installation position of shell-support base 14 on passenger seat 18 of vehicle 19, spring 58 has an effective length S1 and a belt driver comprising belt pusher 40 and spring 58 has an effective length of D3 as suggested in FIG. 10.

Belt pusher 40 is used to apply a downward force to first surface 16S1 of the central portion of anchor belt strap 163 as suggested in FIG. 5. Belt pusher 40 is mounted for up-and-down movement in a central channel 44C defined between two spaced-apart left-side and right-side side walls 44L, 44R included in shell-support base 14. Up-and-down movement of a push plate 44 included in belt pusher 40 is guided by sliding motion of outwardly extending pins 441, 442 included in belt pusher 40 and coupled to push plate 44 in companion pin-receiving slots 441S, 442S formed in left-side and right-side side walls 44L, 44R.

As suggested in FIGS. 6 and 11, push plate 44 has engaged and moved the central portion of the anchor belt strap 163 to change the belt path of anchor belt 16 relative to underlying shell-support base 14 as a result of pivoting movement of actuator lever 52 in counterclockwise direction 52CCW. By changing the belt path, tension in anchor belt 16 is increased to a level-one tension [that is greater than the initial installation tension (IT)] as represented diagrammatically by a belt-tension gauge 24 coupled to anchor belt 16 as suggested in FIG. 6.

Figure 7:
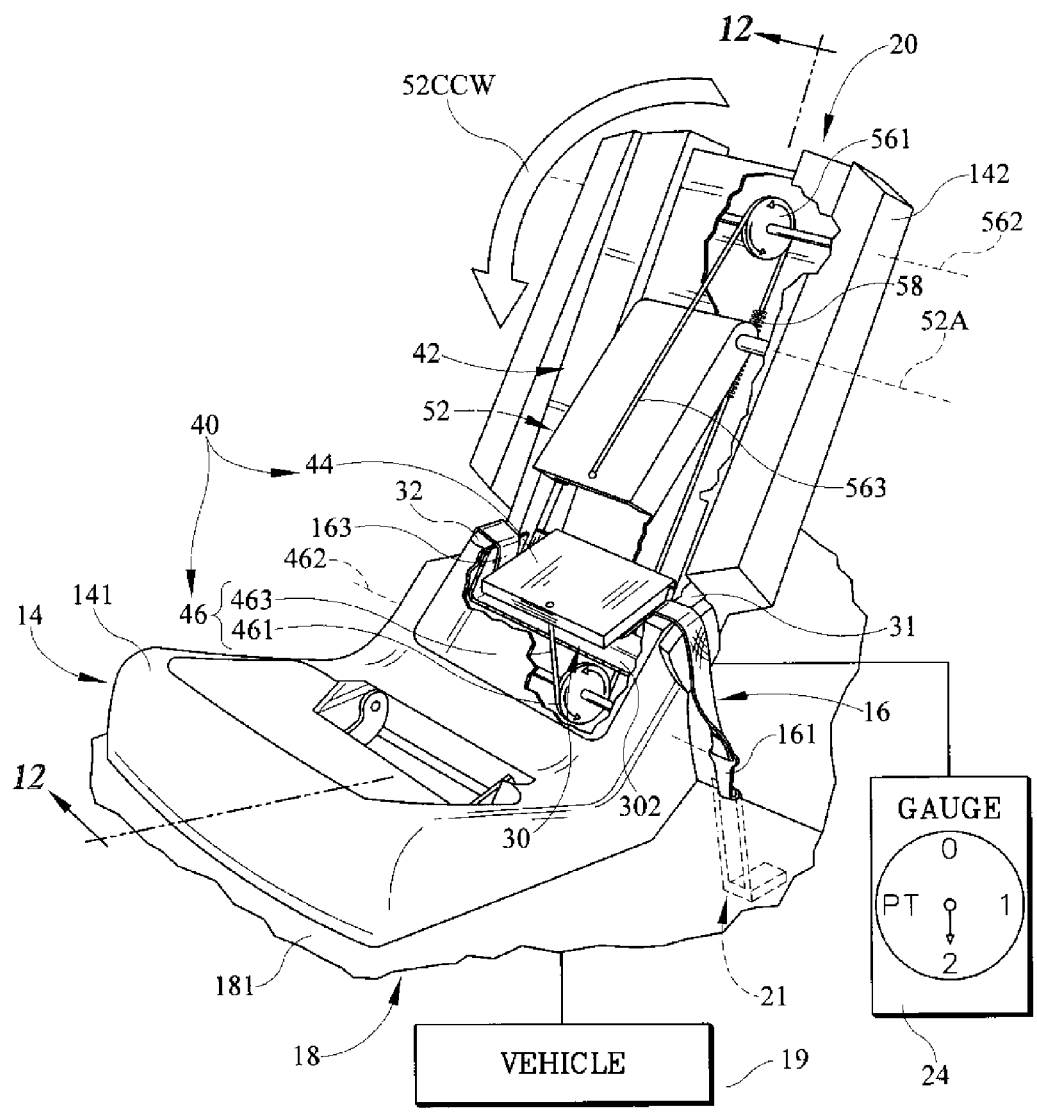

Further counterclockwise pivoting movement of actuator lever 52 to change the belt path of anchor belt 16 further relative to underlying shell-support base 14 is shown, for example, in FIGS. 7 and 12. Tension in anchor belt 16 is now increased to a relatively greater level-two tension as suggested in FIG. 7.

As suggested in FIGS. 8 and 13, push plate 44 has been moved far enough in a downward direction into belt-receiving channel 30 formed between first and second belt-support pads 31, 32 to cause anchor belt 16 to extend along a first changed belt path to increase tension in anchor belt 16 to reach a predetermined tension (PT) that is greater than the initial installation tension (IT) without, in an illustrative example, causing second surface 16S2 of anchor belt 16 to contact underlying channel floor 302 associated with belt-receiving channel 30 so that movement of shell-support base 14 relative to underlying passenger seat 18 is limited in accordance with a predetermined specification. Then juvenile seat shell 12 is mounted, for example, in a forward-facing position on shell-support base 14 as suggested in FIG. 9. In an illustrative embodiment, foundation 141 of shell-support base 14 includes retainer means 15 (see FIGS. 8 and 10) for mating with juvenile seat shell 12 to retain juvenile seat shell 12 in a stationary position on foundation 141 to form juvenile holder 13 as suggested in FIG. 9.

Figures 2, 3:
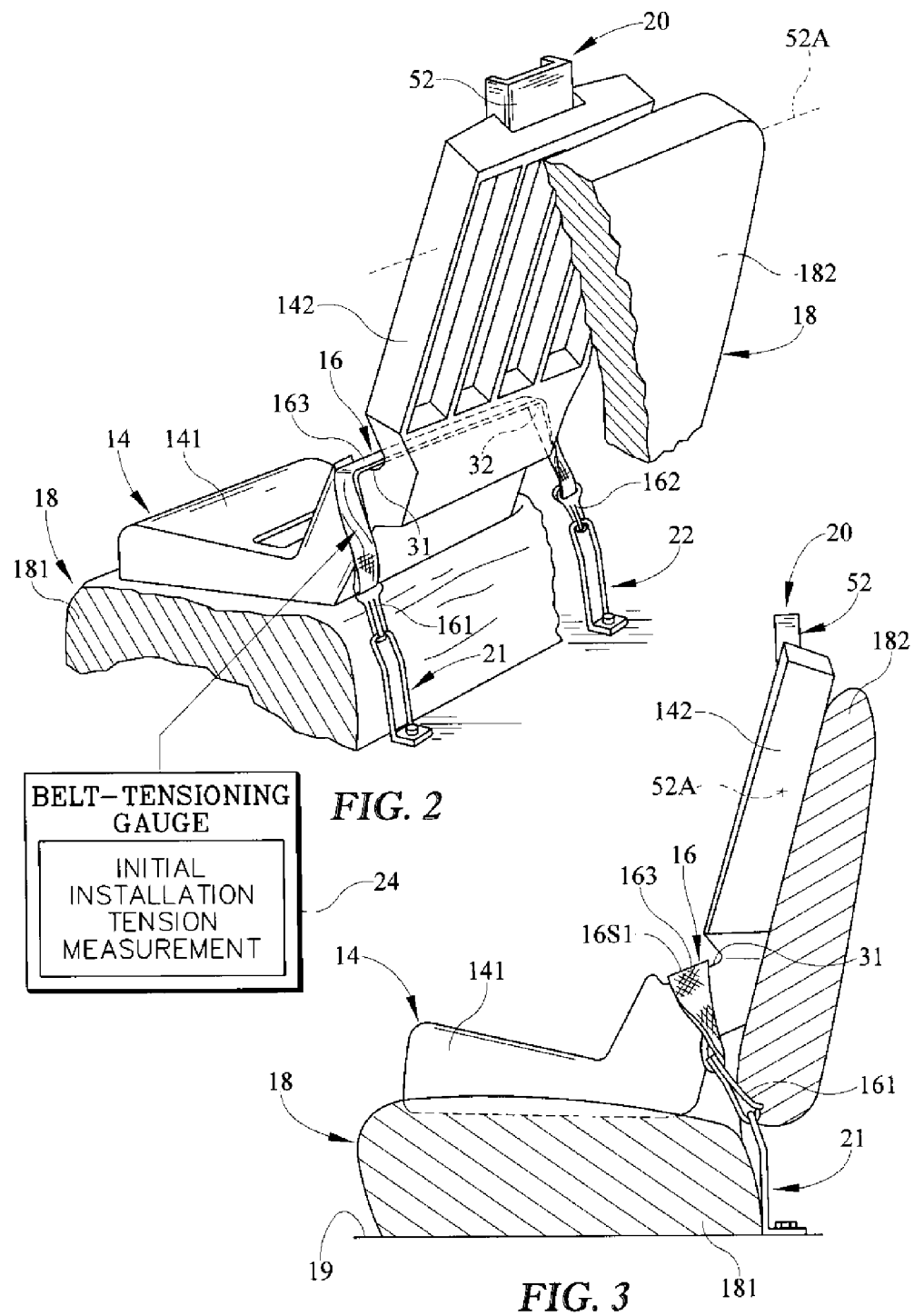
FIG. 2 is a rear perspective view of the passenger seat of FIG. 1, with portions broken away to reveal that the L-shaped shell-support base is held in place on the passenger seat by an anchor belt coupled to and arranged to extend between two anchor mounts and along an initial belt path across a middle section of the shell-support base and lie in a just-installed position on the shell-support base and showing diagrammatically that a belt-tensioning gauge can be used to record an initial installation tension measurement of the anchor belt while it lies in the just-installed position on the shell-support base.
FIG. 3 is a side elevation view of the L-shaped shell-support base and anchor belt of FIG. 2.

As suggested in FIG. 14, the central portion of anchor belt strap 163 has been pushed into belt-receiving channel 130 formed in shell-support base 14 by push plate 44 to cause anchor belt 16 now to extend across a middle section of shell-support base 14 along a first changed belt path that is different from the initial belt path shown, for example, in FIGS. 2-4. Tension in anchor belt 16 is increased by changing the belt path to reach the predetermined tension (PT) as measured by a belt-tension gauge 24 coupled to an outer portion of anchor belt 16. FIG. 15 is a diagrammatic illustration showing (from bottom to top) the shape of anchor belt 16 when it is caused to extend along the first changed belt path, the effective length of spring 58 included in force-transfer device 54 in belt tensioner 20 when anchor belt 16 is caused to extend along the first changed belt path, and the length of anchor belt 16.

As suggested in FIG. 16, child restraint 10 has moved relative to the underlying passenger seat 18 in response to, for example, application of an external load 100 to child restraint 10 (juvenile seat shell 12 has been omitted to show anchor belt 16 more clearly). The amount of downward movement of shell-support base 14 relative to bench 181 of passenger seat 18 is established by subtracting dimension D1 in FIG. 14 from dimension D2 in FIG. 16. Such downward movement of shell-support base 14 relative to passenger seat 18 can cause unexpected detensioning (i.e., loosening) of anchor belt 16 so that the tension of anchor belt 16 is less than the predetermined tension (PT).

To compensate for any movement of shell-support base 14 relative to passenger seat 18, spring 58 in force-transfer device 54 releases stored energy automatically to cause tension in anchor belt 16 to increase as suggested in FIG. 16. The central portion of anchor belt strap 163 has been pushed further into belt-receiving channel 30 by a downward force generated using energy stored in spring 58 and applied to anchor belt strap 163 by push plate 44 to change the path of anchor belt 16 further. Anchor belt 16 now extends along a second changed belt path shown, for example, in FIGS. 16 and 17 that is different from the first changed belt path shown in FIGS. 14 and 15 so as to restore anchor belt 16 to predetermined tension (PT) without any movement of actuator lever 52 relative to shell-support base 14 and while juvenile seat shell 12 remains mounted on shell-support base 14. Second surface 16S2 of anchor belt 16 is maintained above and in spaced-apart relation to underlying channel floor 302 upon movement of anchor belt 16 to extend along the second changed belt path. FIG. 17 is a diagrammatic illustration showing (from bottom to top) the shape of anchor belt 16 when it is caused to extend along the second changed belt path, the increased effected length of spring 58 included in belt tensioner 20 after it has released stored energy to apply a further downward force to the central portion of anchor belt strap 163 to change the belt path of anchor belt 16, and the unchanged length of anchor belt 16 as compared to anchor belt 16 depicted in FIGS. 14 and 15.

Figure 18:
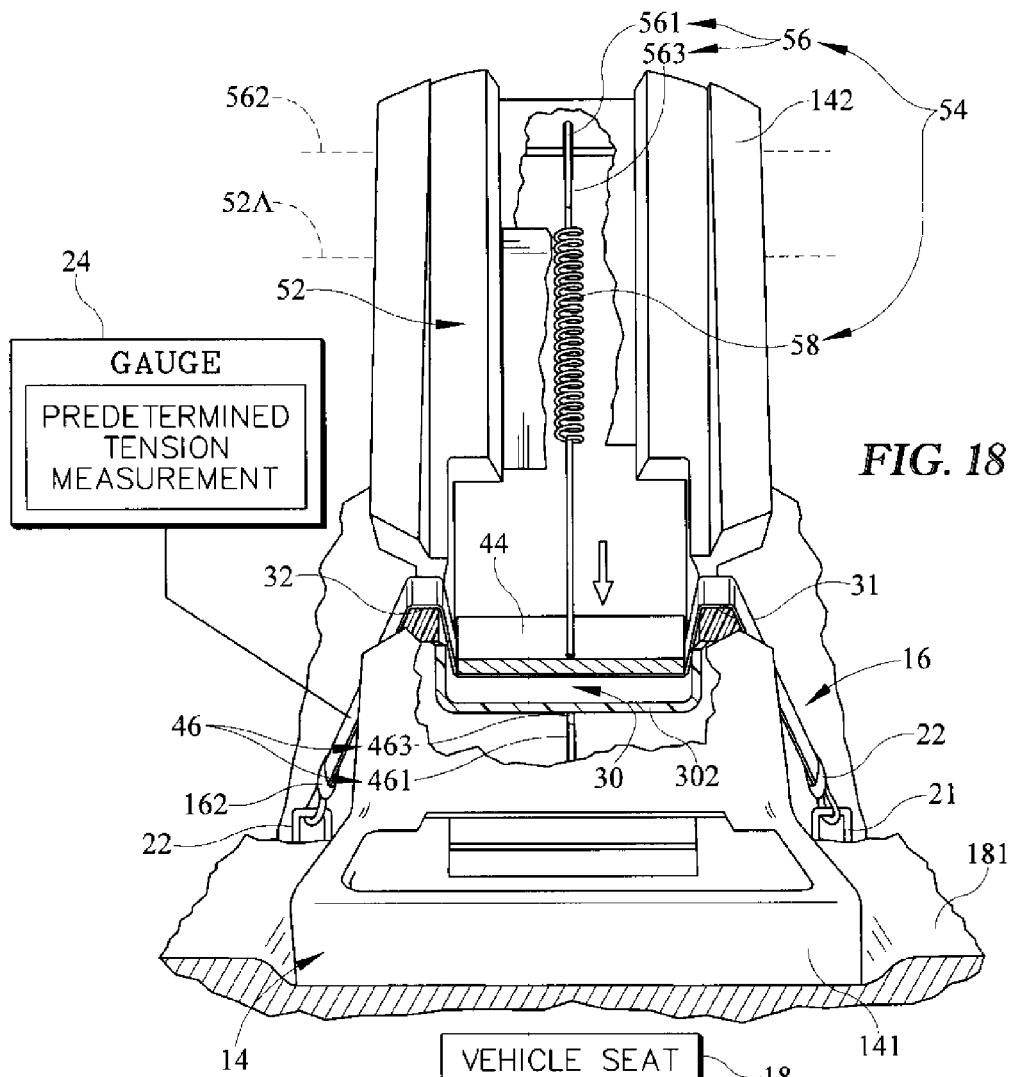
FIG. 18 is a front perspective view similar to FIG. 14 showing use of the child restraint with an anchor belt that has a relatively longer length.
Figure 19:
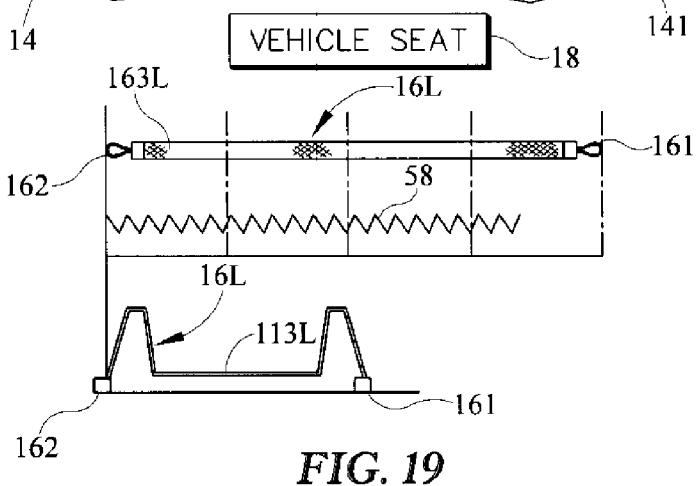
FIG. 19 is a diagrammatic illustration similar to FIG. 15 showing (from top to bottom) a relatively longer anchor belt (as compared to the anchor belt depicted in FIGS. 14 and 15), the relatively longer effective length of the cable-mover spring when the anchor belt is caused to extend along a third changed belt path to increase tension in the relatively longer anchor belt to reach the predetermined tension, and the shape of the relatively longer anchor belt when it is caused to extend along the illustrated changed belt path.

A child restraint 10 with an anchor belt 16 that has a relatively longer length is shown, for example, in FIG. 18. FIG. 19 is a diagrammatic illustration showing (from top to bottom) a relatively longer anchor belt 16 (as compared to the anchor belt 16 depicted in FIGS. 14 and 15), the relatively longer effective length of spring 58 when anchor belt 16 is caused to extend along a third changed belt path to increase tension in the relatively longer anchor belt 16 to reach the predetermined tension (PT), and the shape of the relatively longer anchor belt 16 when it is caused to extend along the illustrated changed belt path.

Belt tensioner 20, as shown in FIG. 1, includes belt pusher 40, cable-moving system 42 for moving belt pusher 40 relative to shell-support base 14, and tension-locking unit 50 which is configured to provide means for selectively engaging belt pusher 40 temporarily to block movement of belt pusher 40 relative to actuator lever 52 included in cable-moving system 42. After actuator lever 52 has reached the final downwardly extending position to retain spring 58 in an energy-storing compressed state until any unexpected detensioning of anchor belt 16 occurs to cause tension in anchor belt 16 to be lower than the predetermined tension (PT).

Tension-locking unit 50 may be coupled to spring mount 56 to move therewith and may be configured to assume an unlocked-state in response to movement of actuator lever 52 away from the final downwardly extending position as shown in FIGS. 7 and 14 to cause plate puller 46 included in belt pusher 40 to be freed to move up-and-down relative to spring mount 56. Tension-locking unit 50 is also configured to assume a locked state in response to movement of actuator lever 52 to the final downwardly extending position as shown in FIGS. 8 and 18 to cause tension-locking unit 50 to engage plate puller 46 of belt pusher 40 so that movement of belt pusher 40 in an upward direction is blocked.

Child restraint 10 is configured to hold a young child or infant and is provided for use with both a vehicle passenger seat 18 and anchor mounts 21, 22 (or 121, 122) provided near vehicle passenger seat 18 as suggested in FIG. 1. Child restraint 10 includes a juvenile holder 13, anchor belt 16 (or 16A or 16B), and belt tensioner 20 in an illustrative embodiment as suggested in FIG. 1. Juvenile holder 13 includes juvenile seat shell 12 and shell-support base 14 as suggested in FIG. 1. Shell-support base 14 is adapted for mounting on vehicle passenger seat 18 and arranged to support juvenile seat shell 12 in a stationary position thereon as suggested in FIG. 9.

Anchor belt 16 is arranged to overlie first and second belt-support pads 31, 32 included in shell-support base 14 and to communicate with belt-receiving channel 30 formed therebetween as suggested in FIGS. 1-4. Anchor belt 16 includes a strap 163 having opposite end portions and a central portion interconnecting the opposite end portions as suggested in FIGS. 1 and 3. Anchor belt 16 also includes first and second connectors 161, 162 as shown in FIG. 1. Each of connectors 161, 162 is coupled to one of the end portion and adapted to be coupled to one of the anchor mounts 21, 22 to establish a belt path of the anchor belt 16 relative to the first and second belt-support pads 31, 32 when the central portion of strap 163 lies on first and second belt-support pads 31, 32 and each connector (161 or 162) mates with a companion one of anchor mounts (21 or 22) following initial installation of anchor belt 16 on shell-support base 14 and to cause anchor belt 16 to produce an initial tension measurement when exposed to a belt-tension gauge 24 during an initial belt-tensioning test.

Belt tensioner 20 is coupled to shell-support base 14 and configured to include push plate 44 included in belt pusher 40. Push plate 44 is arranged to lie above a section of the central portion of strap 163 spanning belt-receiving channel 30 and move in up-and-down relation to shell-support base 14 in a guide 441S, 442S formed in shell-support base 14 as suggested in FIGS. 4, 6-8, and 10-13. Belt tensioner 20 also includes belt-path changer means 42 for applying a downward force to belt pusher 40 to move belt pusher 40 in guide 441S, 442S in a downward direction toward foundation 141 to engage the central portion of anchor belt 16 while connectors 161, 162 included in anchor belt 16 remain coupled to anchor mounts 21, 22 and anchor belt 16 remains in contact with first and second belt-support pads 31, 32 to cause a change in the belt path of anchor belt 16 relative to first and second belt-support pads 31, 32 to establish a first changed belt path to increase tension in anchor belt 16 to produce a predetermined tension measurement that is greater than the initial tension measurement when exposed to belt-tension gauge 24 during a subsequent second belt-tensioning test so that movement of shell-support base 14 and juvenile seat shell 12 coupled to shell-support base 14 relative to an underlying vehicle passenger seat 18 is limited in accordance with a predetermined specification.

Belt-path changer means 42 is configured to change the belt path of anchor belt 16 while anchor belt 16 is coupled to first and second anchor mounts 21, 22 from the initial belt path shown, for example, in FIG. 4 to a first changed belt path shown, for example, in FIGS. 8 and 9. The belt path is changed before juvenile seat shell 12 is mounted on shell-support base 14 to take slack out of anchor belt 16 so as to increase tension in anchor belt 16 from an initial installation tension (IT) associated with the just-installed position of anchor belt 16 to a relatively greater predetermined tension (PT) so that movement of shell-support base 14 and juvenile seat shell 12 coupled in shell-support base 14 relative to an underlying passenger seat 18.

Belt-path changer means 42 includes an actuator 52 mounted for movement on shell-support base 14 from an inactive position to an active position shown, for example, in FIGS. 8 and 13. It is within the scope of this disclosure to mount an actuator for pivoting, sliding, twisting, or rotating movement on shell-support base 14 to cause belt pusher 40 to move to engage and deform anchor belt 16. Belt-path changer means 42 also includes a force-transfer device 54 coupled to each of belt pusher 40 and actuator 52 as suggested in FIGS. 1 and 4. Force-transfer device 54 is configured to apply the downward force to the belt pusher 40 in response to movement of actuator 52 relative to shell-support base 14 from the inactive position to the active position as suggested in FIGS. 10-13.

Force-transfer device 54 includes a spring mount 56 coupled to the actuator 52 and a spring 58 coupled to and interposed between the belt pusher 40 and the spring mount 56. Spring mount 56 includes spring cable 563 coupled to actuator 52 and spring-cable pulley 561 coupled to back 142 and configured to rotate about upper pulley axis 562. Spring cable 563 is routed from actuator 52 around spring-cable pulley 561 and downward toward spring 58 as shown, for example, in FIGS. 1, 4, and 10. Belt pusher 40 includes push plate 44 arranged to engage the central portion of anchor belt strap 163 and plate puller 46 arranged to extend downwardly from the push plate 44 to engage spring 58 as suggested in FIGS. 1 and 4.

In an illustrative embodiment, actuator 52 is a lever mounted for pivotable movement on shell-support base 14 about actuator pivot axis 52A between the inactive and active positions. Spring-cable pulley 561 is mounted for rotating movement on back 142 about upper pulley axis 562 to allow spring cable 563 to move around spring-cable pulley 561 during pivoting movement of actuator lever 52 about actuator pivot axis 52A as suggested in FIGS. 10-13.

Shell-support base 14 is formed to include a foundation 141 adapted to set on passenger seat 18 in a vehicle 19 and to mate with juvenile seat shell 12 to support juvenile seat shell 12 on shell-support base 14 and a back 142 extending upwardly away from foundation 141 as suggested in FIGS. 1 and 4. Actuator lever 52 is sized and arranged to lie in a channel 142C formed in back 142 of shell-support base 14 in response to movement of actuator lever 52 to the active position as suggested in FIGS. 8, 19, and 13.

Back 142 of shell-support base 14 is formed to include a pair of side walls 142A, 142B arranged to lie in spaced-apart relation to one another and a floor 142F arranged to extend between side walls 142A, 142B and cooperate with side walls 142A, 142B to form boundaries of channel 142C as suggested in FIG. 4. Force-transfer device 54 is arranged to lie in channel 142C formed in the back 142.

Belt pusher 40 includes a push plate 44 arranged to engage the central portion of strap 163 of anchor belt 16 and a plate puller 46 coupled to push plate 44 and to force-transfer device 54 as suggested in FIG. 1. Plate puller 46 is arranged to transfer the downward force from force-transfer device 54 to push plate 44 during pivoting movement of the actuator 52 from the inactive position to the active position as suggested in FIGS. 10-13. A portion of plate puller 46 is arranged to extend into channel 142C and lie in channel 142C during pivoting movement of actuator lever 52 from the inactive position to the active position as suggested in FIGS. 4, 6-8, and 10-13.

First side wall 142A in the shell-support base 14 includes a lower portion 44R that is formed to include a first pin-receiving slot 441S defining a guide. Belt pusher 40 further includes a first outwardly extending pin 441 arranged to extend into pin-receiving slot 441S formed in lower portion 44R of first side wall 142A and move up and down therein to guide movement of belt pusher 40 relative to shell-support base 14 during pivoting movement of actuator lever 52 between the inactive and active positions as suggested in FIGS. 4-8.

Belt-path changer means 42 includes an actuator lever 52 mounted on shell-support base 14 for pivotable movement about an actuator pivot axis 52A and two-stage belt-mover means for (1) moving push plate 44 of belt pusher 40 in the downward direction to engage and move central portion 163 of anchor belt 16 to establish the targeted first changed belt path of anchor belt 16 and place anchor belt 16 in tension at about the predetermined tension (PT) in response to pivotable movement of actuator lever 52 about actuator pivot axis 52A during a first actuation stage relative to shell-support base 14 and (2) storing energy during such pivotable movement of actuator lever 52 that is later released in a subsequent second actuation stage in response to any unexpected detensioning of anchor belt 16 sufficient to change tension in anchor belt 16 to a magnitude that is less than the predetermined tension (PT) to move belt pusher 40 further in the downward direction to move central portion 163 of anchor belt 16 to establish a second changed belt path of anchor belt 16 to a tensioned condition characterized by the predetermined tension (PT) without any movement of actuator lever 52 relative to shell-support base 14.

The two-stage belt mover means 42 includes a spring mount 56 coupled to actuator lever 52 for movement relative to back 142 of shell-support base 14 during pivoting movement of actuator lever 52 about actuator pivot axis 52A and a spring 58 coupled to and interposed between belt pusher 40 and spring mount 56. Spring 58 is configured to apply the downward force to belt pusher 40 during pivoting movement of actuator lever 52 from an initial outwardly extending position extending away from the belt pusher 40 suggested in FIGS. 4 and 10 to a final downwardly extending position extending toward belt pusher 40 and the central portion of anchor belt strap 163 as suggested in FIGS. 8 and 13. Spring 58 is also configured to store energy during movement of actuator lever 52 from the initial outwardly extending position to the final downwardly extending position in the first actuation stage which energy is later released in the subsequent second actuation stage. Push plate 44 is arranged to engage the central portion of anchor belt strap 163 and a plate puller 46 coupled to push plate 44 and to spring 58. Plate puller 46 is arranged to transfer the downward force from spring 58 to push plate 44 through pull cable 463 during each of the first and second actuation stages.

Spring 58 is an elastic extendable energy-storage spring configured to store energy during movement of actuator lever 52 from the initial outwardly extending position to the final downwardly extending position in the first actuation stage which energy is later released in the subsequent second actuation stage as suggested in FIGS. 10-13 and 14-17. Push plate 44 is arranged to engage the central portion of anchor belt strap 163 and plate puller 46 coupled to push plate 44 and to spring 58. Plate puller 46 is arranged to transfer the downward force from spring 58 to push plate 44 during each of the first and second actuation stages. In an illustrative embodiment, spring 58 is a coiled extension spring.

Spring 58 includes an upper end coupled to spring cable 563 and a lower end coupled to pull-cable pulley 461 as suggested in FIGS. 4 and 10. Spring 58 is elongated to store energy during the first actuation stage in response to movement of the belt pusher 40 away from actuator 52 as suggested in FIGS. 7, 8, 11, 12, 17, and 18. Spring 58 is compressed to release energy automatically during the subsequent second actuation stage in response to movement of the belt pusher 40 away from actuator 52 as suggested in FIGS. 19 and 20.

Spring 58 is an elongated coiled extension spring having an upper end coupled to the second end of spring cable 563 and a lower end arranged to extend toward pull-cable pulley 461 and couple to the second end of pull cable 463. Spring 58 is extended to store energy during change of anchor belt 16 from the initial belt path to the first changed belt path as suggested in FIGS. 10-13.

Belt tensioner 20 further includes tension-locking unit 50 that is configured to provide detent means for selectively engaging belt pusher 40 temporarily to block movement of belt pusher 40 relative to actuator lever 52 after actuator lever 52 has reached the final downwardly extending position to retain spring 58 in an energy-storing extended state between belt pusher 40 and spring mount 56 until any unexpected detensioning of anchor belt 16 occurs to cause tension in anchor belt 16 to be lower than predetermined tension (PT). At that time, tension-locking unit disengages belt pusher 40 in response to exposure to the downward force generated by release of energy stored in spring 58 to allow belt pusher 40 to move further in the downward direction in response to exposure to the downward force applied by spring 58 to move anchor belt 16 relative to shell-support base 14 to extend along the second changed belt path to restore anchor belt 16 to the tensioned condition characterized by the predetermined tension (PT).

As shown in FIG. 10, when actuator lever 52 of is the upwardly extending initial position, an initial distance D3 between upper pulley axis 562 and push plate 44 is defined. At the same instance, spring 58 of force-transfer device 54 has an initial spring length S1. As illustrated in FIG. 11, actuator lever 52 has begun to rotate about actuator pivot axis 52A in counterclockwise direction 52CCW and push plate 44 has engaged and begun to move anchor belt 16. At this instance, a second relatively larger distance D4 is established between upper pulley axis 562 and push plate 44 and spring length S1 remains substantially unchanged. As shown in FIG. 12, actuator lever 52 has continued rotating about actuator pivot axis 52A toward the downwardly extending final position. As a result, a relatively larger intermediate dimension D5 is established between upper pulley axis 562 and push plate 44 and a relatively larger intermediate spring length S2 is established. As shown in FIG. 13, actuator lever 52 has moved to the downwardly extending final position. As a result, a relatively larger final dimension D6 is established between upper pulley axis 562 and push plate 44 and a relatively larger final spring length S3 is established.

In use, actuator lever 52 is accessed on a front portion of shell-support base 14 by a caregiver as suggested in FIGS. 4-8 and 10-13. A lever lock (not shown) is released by the caregiver to allow actuator lever 52 to be moved upwardly relative to shell-support base 14 from the active position shown in FIGS. 8 and 13 to the inactive position shown in FIGS. 4 and 10. Opening actuator lever 52 in this manner raises belt pusher 40 upward to an easily accessible location ready for feeding anchor belt 16 under belt pusher 40.

Next, anchor belt 16 is fed through a passageway below belt pusher 40 and above belt-support pads 31, 32. These belt-support pads 31, 32 are located on outer sides of shell-support base 14 in line with anchor mounts 21, 22 associated with passenger seat 18 to help guiding anchor belt 16 relative to shell-support base 14.

After anchor belt 16 is fed through the passageway under belt pusher 40, anchor belt 16 is coupled to companion anchor mounts such as anchor mounts 21, 22 (or other suitable anchor mounts). Actuator lever 52 then is moved downwardly giving mechanical advantage to the caregiver. Actuator lever 52 drives force-transfer device 54 to move belt pusher 40 along a guide 441S, 442S toward an underlying portion of anchor belt 16 to contact anchor belt 16 and change the path of anchor belt 16. As actuator lever 52 closes and locks, belt pusher 40 tensioning between two outer fixed contact points established, for example, by belt-support pads 31, 32 progressively adds more force to anchor belt 16 until correct tension is achieved. Any leftover tension force gets stored in energy-storage spring 58 included in force-transfer device 54 for supplemental tension if needed later.

In the active (i.e., closed) position, actuator lever has pushed force-transfer device 54 and belt pusher 40 to cause the anchor belt 16 to deviate (i.e., change) from its initial belt path taking up to, for example, seven to eight inches of any belt slack and applying increased tension to anchor belt 16 until correct tension is indicated or until clutched out due to over tension.

Energy-storage spring 58 stores spring tension while actuator lever 52 is used. Stored spring tension adds tension back to belt pusher 40 to urge belt pusher 40 against anchor belt 16 if a loss of tension occurs unexpectedly, keeping anchor belt 16 tensioned properly. Energy-storage spring 58 stores supplemental load and releases force to belt pusher 40 and thus to anchor belt 16 without caregiver input to maintain belt tension under, for example, changing temperatures that may affect passenger seat foam compression conditions.

The invention claimed is:

1. A child restraint is provided for use with both a vehicle passenger seat and anchor mounts provided near the vehicle passenger seat, the child restraint comprising
    a juvenile holder including a juvenile seat shell and a shell-support base, the shell-support base having a foundation adapted to set on a bench included in a passenger seat in a vehicle and a back extending upwardly from the foundation along an upright backrest included in the passenger seat in the vehicle, the foundation being formed to include a first belt-support pad and a second belt-support pad arranged to lie in spaced-apart relation to the first belt-support pad to form a belt-receiving channel therebetween, the foundation of the shell-support base being arranged to support the juvenile seat shell in a stationary position thereon,
    an anchor belt arranged to overlie the first and second belt-support pads and to communicate with the belt-receiving channel therebetween, the anchor belt including a strap having opposite end portions and a central portion interconnecting the opposite end portions and lying on the first and second belt-support pads to form a bridge spanning the belt-receiving channel and a connector coupled to each end portion and adapted to be coupled to one of the anchor mounts to establish a belt path of the anchor belt relative to the first and second belt-support pads when the central portion of the strap lies on the first and second belt-support pads and each connector mates with a companion one of the anchor mounts following initial installation of the anchor belt on the shell-support base to assume a just-installed position and to cause the anchor belt to produce an initial tension measurement when exposed to a belt-tension gauge during an initial belt-tensioning test, and a belt tensioner coupled to the back of the shell-support base and configured to include a belt pusher arranged to lie above a section of the central portion of the strap spanning the belt-receiving channel and move in up-and-down relation to the shell-support base in a guide formed in the back of the shell-support base and belt-path changer means for applying a downward force to the belt pusher to move the belt pusher in the guide in a downward direction toward the foundation to engage the central portion of the anchor belt before the juvenile seat shell is coupled to the foundation of the shell-support base and while the connectors included in the anchor belt remain coupled to the anchor mounts and the anchor belt remains in contact with the first and second belt-support pads to cause a change in the belt path of the anchor belt relative to the first and second belt-support pads to establish a first changed belt path to increase tension in the anchor belt to produce a predetermined tension measurement that is greater than the initial tension measurement when exposed to the belt-tension gauge during a subsequent second belt-tensioning test so that movement of the shell-support base and the juvenile seat shell coupled to the foundation of shell-support base relative to an underlying vehicle passenger seat is limited in accordance with a predetermined specification.

2. The child restraint of claim 1, wherein the anchor belt includes a first surface arranged to be engaged by the belt pusher during movement of the belt pusher in the downward direction toward the foundation, the anchor belt also includes an opposite second surface, and the second surface of the central portion of the anchor belt is arranged to lie above and in spaced-apart relation to any underlying portion of the foundation upon movement of the anchor belt to extend along the first changed belt path so that a space is provided between the second surface of the central portion of the anchor belt and the foundation.

3. The child restraint of claim 2, wherein the belt-receiving channel is defined in part by a floor lying below and facing upwardly toward the second surface of the central portion of the anchor belt and extending between the first and second belt-support pads and the second surface of the central portion of the anchor belt is arranged to lie above and in spaced-apart relation to the floor upon movement of the anchor belt to extend along the first changed belt path.

4. The child restraint of claim 1, wherein the back of the shell-support base is formed to include a channel extending upwardly away from the foundation and the belt-path changer means includes an actuator mounted for movement on the back of the shell-support base from an inactive position to an active position and a force-transfer device coupled to each of the belt pusher and the actuator and configured to apply the downward force to the belt pusher in response to movement of the actuator relative to the back of the shell-support base from the inactive position to the active position and the actuator is sized and arranged to lie in the channel formed in the back of the shell-support base in response to movement of the actuator to the active position and wherein the back is formed to include a pair of side walls arranged to lie in spaced-apart relation to one another and a floor arranged to extend between the side walls and cooperate with the side walls to form boundaries of the channel and the force-transfer device is arranged to lie in the channel formed in the back.

5. The child restraint of claim 4, wherein the belt pusher includes a push plate arranged to engage the central portion of the strap of the anchor belt and a plate puller coupled to the push plate and to the force-transfer device and arranged to transfer the downward force from the force-transfer device to the push plate during pivoting movement of the actuator from the inactive position to the active position and a portion of the plate puller is arranged to extend into the channel and lie in the channel during pivoting movement of the actuator from the inactive position to the active position.

6. The child restraint of claim 4, wherein the belt pusher includes a push plate arranged to engage the central portion of the strap of the anchor belt and a plate puller coupled to the push plate and to the force-transfer device and arranged to transfer the downward force from the force-transfer device to the push plate during pivoting movement of the actuator from the inactive position to the active position, a first of the side walls included in the back of the shell-support base is formed to include a pin-receiving slot defining the guide, and the belt pusher further includes an outwardly extending pin coupled to the push plate and arranged to extend into the pin-receiving slot formed in the first of the side walls and move up and down therein to guide movement of the belt pusher relative to the back of the shell-support base during pivoting movement of the actuator lever between the inactive and active positions.

7. The child restraint of claim 1, wherein the belt-path changer means includes an actuator lever mounted for pivotable movement on the back of the shell-support base about an actuator pivot axis from an inactive position associated with an initial belt path corresponding to the just-installed position of the anchor belt to an active position associated with the first changed belt path of the anchor belt and a force-transfer device coupled to the actuator lever for movement relative to the back of the shell-support base and coupled to the belt pusher and configured to apply the downward force to the belt pusher in response to pivoting movement of the actuator lever about the actuator pivot axis relative to the back of the shell-support base from the inactive position to the active position.

8. The child restraint of claim 7, wherein the back of the shell-support base is formed to include a pin-receiving slot defining the guide and the belt-pusher further includes an outwardly extending pin coupled to the push plate and arranged to extend into the pin-receiving slot and move up and down therein to guide movement of the belt pusher relative to the back of the shell-support base during pivoting movement of the actuator lever about the actuator pivot axis between the inactive and active positions.

9. The child restraint of claim 7, wherein the force-transfer device includes a spring mount coupled to the actuator and a spring coupled to and interposed between the belt pusher and the spring mount.

10. The child restraint of claim 9, wherein the spring mount includes spring-cable pulley coupled to the back of the shell-support base to rotate about an upper pulley axis and a spring cable coupled to the actuator and to the belt pusher to move with the actuator during movement of the actuator between the inactive and active positions.

11. The child restraint of claim 10, wherein the belt pusher includes a push plate arranged to engage the central portion of the strap of the anchor belt and a plate puller arranged to extend downwardly from the push plate into the belt-travel channel to couple to the spring.

12. The child restraint of claim 11, wherein the plate puller includes a pull-cable pulley coupled to the foundation of the shell-support base to rotate about a lower-pulley axis and a pull cable routed around the pull-cable pulley and having a first end coupled to the push plate and a second end coupled to the spring.

13. The child restraint of claim 7, wherein the force-transfer device includes a cable pulley coupled to the back of the shell-support base to rotate about an upper pulley axis and a cable routed over the cable pulley and having a first end coupled to the actuator and an opposite second end and the belt pusher includes a push plate arranged to engage the central portion of the strap of the anchor belt and a plate puller arranged to extend downwardly from the push plate to engage the opposite second end of the cable.

14. The child restraint of claim 13, wherein the back of the shell-support base is formed to include a pin-receiving slot defining the guide and the belt pusher further includes an outwardly extending pin coupled to the push plate and arranged to extend into the pin-receiving slot and move up and down therein to guide movement of the belt pusher relative to the back of the shell-support base during pivoting movement of the actuator lever about the actuator pivot axis between the inactive and active positions.

15. The child restraint of claim 13, wherein the belt pusher is mounted for up-and-down movement in a central channel formed in the back of the shell-support base and defined between spaced-apart left-side and right-side side walls included in the back of the shell-support base and wherein up-and-down movement of the push plate is guided by sliding motion of first and second outwardly extending pins included in the belt pusher and coupled to the push plate in companion guide slots formed in the left-side and right-side side walls to define the guide.

16. The child restraint of claim 13, wherein the back is arranged to terminate along a top edge arranged to lie in spaced-apart relation to the foundation and the actuator pivot axis is positioned to lie in spaced-apart relation to the top edge to locate the upper pulley axis therebetween.

17. The child restraint of claim 16, wherein the back is formed to include a forwardly opening channel extending from about the top edge downwardly toward the foundation and the actuator lever is sized and shaped to lie in the forwardly opening channel to locate the force-transfer device in the forwardly opening channel in a space provided between the actuator lever and the back of the shell-support base upon movement of the actuator lever to the active position.

* * * * *